United States Patent
Meng

(10) Patent No.: US 12,142,441 B2
(45) Date of Patent: Nov. 12, 2024

(54) MEMS STRUCTURE-BASED ADJUSTABLE CAPACITOR

(71) Applicants: ACCULA TECHNOLOGIES HONG KONG COMPANY LIMITED, Hong Kong (CN); ACCULA ELECTRONIC TECHNOLOGIES PTE. LTD, Singapore (SG); ACCLUA TECHNOLOGY INC., Vancouver (CA); ACCULA COMMUNICATION ELECTRONIC COMPANY PTE LTD, Singapore (SG)

(72) Inventor: Qingnan Meng, Hubei (CN)

(73) Assignees: ACCULA TECHNOLOGIES HONG KONG COMPANY LIMITED, Hong Kong (CN); ACCULA ELECTRONIC TECHNOLOGIES PTE. LTD, Singapore (SG); ACCLUA TECHNOLOGY INC., Vancouver (CA); ACCULA COMMUNICATION ELECTRONIC COMPANY PTE LTD, Singapore (SG)

( * ) Notice: Subject to any disclaimer, the term of this patent is extended or adjusted under 35 U.S.C. 154(b) by 117 days.

(21) Appl. No.: 17/784,629

(22) PCT Filed: Aug. 24, 2020

(86) PCT No.: PCT/CN2020/110778
§ 371 (c)(1),
(2) Date: Jun. 11, 2022

(87) PCT Pub. No.: WO2022/027738
PCT Pub. Date: Feb. 10, 2022

(65) Prior Publication Data
US 2023/0170154 A1    Jun. 1, 2023

(30) Foreign Application Priority Data

Aug. 4, 2020   (CN) ........................ 202010771747.2

(51) Int. Cl.
*H01G 5/38*   (2006.01)
*H01G 5/011*   (2006.01)
(Continued)

(52) U.S. Cl.
CPC .............. *H01G 5/38* (2013.01); *H01G 5/011* (2013.01); *H01G 5/013* (2013.01); *H01G 5/16* (2013.01)

(58) Field of Classification Search
None
See application file for complete search history.

(56) References Cited

U.S. PATENT DOCUMENTS 7,141,989 B1 *   11/2006   Liu ........................... H01G 5/16
                                                                          324/661
2002/0131230 A1 *   9/2002   Potter ...................... H01G 5/16
                                                                          361/277
(Continued)

FOREIGN PATENT DOCUMENTS

| CN | 1769159 A | 5/2006 |
| CN | 103413681 A | 11/2013 |

(Continued)

OTHER PUBLICATIONS

The search report of family SG application No. 11202250577B issue on Aug. 24, 2020.
(Continued)

*Primary Examiner* — Dion R. Ferguson
(74) *Attorney, Agent, or Firm* — Samson G. Yu

(57) ABSTRACT

An MEMS structure-based adjustable capacitor is provided, comprising: a lower plate A, a movable plate B, an upper plate C, a fixed apparatus D and one or more connecting (Continued)

conductors E; a lower end of the fixed apparatus D is fixedly connected to the lower plate A, an upper end of the fixed apparatus D is fixedly connected to the upper plate C, a structure B4 is provided at a middle part of movable plate B, and the movable plate B is able to move up and down along the fixed apparatus D; the lower plate A is provided with a lower electrode A1, and the movable plate B is provided with a movable electrode B1 and adjustment electrodes B2; the lower electrode A1 and the movable electrode B1 constitute a unit capacitor; and the upper plate C is provided with an upper electrode C1 and adjustment electrodes C2.

20 Claims, 8 Drawing Sheets

(51) Int. Cl.
    *H01G 5/013*     (2006.01)
    *H01G 5/16*     (2006.01)

(56) References Cited

U.S. PATENT DOCUMENTS

| | | | |
|---|---|---|---|
| 2004/0008396 A1* | 1/2004 | Stappaerts | G02B 26/0841 359/245 |
| 2006/0003482 A1* | 1/2006 | Chinthakindi | H01G 5/18 438/52 |
| 2006/0171097 A1* | 8/2006 | Shimanouchi | H01G 5/16 361/277 |
| 2009/0009925 A1* | 1/2009 | Hilgers | H01G 5/38 361/277 |
| 2009/0201623 A1* | 8/2009 | Steeneken | H01G 5/40 361/290 |
| 2012/0068278 A1* | 3/2012 | Knipe | H01H 1/0036 257/E21.52 |
| 2012/0103768 A1* | 5/2012 | Bachman | H01G 5/18 29/592.1 |
| 2013/0285164 A1 | 10/2013 | Saito et al. | |
| 2014/0009862 A1 | 1/2014 | Lan et al. | |
| 2016/0055980 A1* | 2/2016 | Knipe | H01G 5/0136 361/278 |
| 2016/0072408 A1* | 3/2016 | Khieu | H01H 59/0009 318/116 |
| 2016/0079003 A1* | 3/2016 | Hirayu | B81C 99/003 327/111 |
| 2016/0176701 A1 | 6/2016 | Gupta et al. | |
| 2016/0207763 A1* | 7/2016 | Troy | H01G 5/16 |
| 2016/0240320 A1* | 8/2016 | Renault | H01G 5/011 |
| 2016/0268052 A1 | 9/2016 | Gando et al. | |
| 2016/0297677 A1* | 10/2016 | Huffman | H01G 5/16 |
| 2023/0170154 A1* | 6/2023 | Meng | H01G 5/38 361/299.4 |

FOREIGN PATENT DOCUMENTS

| | | |
|---|---|---|
| CN | 103680959 A | 3/2014 |
| CN | 104876176 A | 9/2015 |
| CN | 108281286 A | 7/2018 |
| CN | 207587533 A | 7/2018 |
| CN | 108400144 A | 8/2018 |
| CN | 215600243 U | 1/2022 |
| EP | 1093142 A | 4/2001 |
| JP | 2003282359 A | 10/2003 |
| JP | 2009253155 A | 10/2009 |
| TW | 201514089 A | 4/2015 |
| WO | 2013108705 A1 | 7/2013 |
| WO | 2015009360 A1 | 1/2015 |
| WO | 2015017743 A1 | 2/2015 |

OTHER PUBLICATIONS

The search report of family EP application No. 20948835 issue on Dec. 15, 2023.
The first office action of family JP application No. 2023-512259 issue on Oct. 5, 2023.

* cited by examiner

MEMS STRUCTURE-BASED ADJUSTABLE CAPACITOR

CROSS REFERENCE

This application is a National Stage Filing of the PCT International Application No. PCT/CN2020/110778 filed on Aug. 24, 2020, which claims priority to Chinese Application No. 202010771747.2 filed on Aug. 4, 2020, the entirety of which is herein incorporated by reference.

TECHNICAL FIELD

The present disclosure belongs to the technical field of capacitor devices, and in particular, to a Micro-Electro-Mechanical System (MEMS) structure-based adjustable capacitor.

BACKGROUND

In conventional radio frequency circuit applications, it is often required to enable a radio frequency circuit to work at different working frequency bands. When the radio frequency circuit works at different frequency bands, a capacitance value of a matching circuit corresponding to the radio frequency circuit needs to be adjusted correspondingly, so as to obtain an optimal radio frequency performance. Therefore, in order to enable the radio frequency circuit to work at different frequency bands, parameter values of a matching capacitor in the radio frequency circuit need to be adjusted. In this type of radio frequency circuits, using an adjustable capacitor is the most suitable design scheme. Currently, there are four methods for achieving the adjustable capacitor. A first method is to achieve the adjustment of a capacitor by using a varactor diode, and the adjustment of a capacitance value of the varactor diode can be achieved by adjusting a bias voltage value of the varactor diode. However, a problem of using the varactor diode is that the varactor diode has a relatively low voltage withstand value, and thus can only be applied in a low-power radio frequency circuit, which cannot meet the requirements of high power and high voltage withstand in a radio frequency high power amplifier. A second solution for achieving the adjustable capacitor is to use a mechanical variable capacitor, in which the capacitance value of the mechanical variable capacitor is adjusted by adjusting mechanical sizes of an upper plate C and a lower plate A of the capacitor or adjusting spacing between the upper plate C and the lower plate A. However, the adjustable capacitor solution achieved by using a pure mechanical structure has disadvantages such as large volume of the adjustable capacitor, limited adjustable step and adjustable range of the capacitor, and that real-time adjustment cannot be achieved. A third solution for achieving the adjustable capacitor is to use multiple groups of capacitors connected in series or in parallel, and connect radio frequency switches between series-connected lines and parallel-connected lines, so as to achieve different combinations of the capacitors connected in series or in parallel by controlling the on/off of the radio frequency switches. The disadvantages of the third solution are that as the adjustable capacitor needs to have a high voltage withstand value and a high current withstand value, the corresponding switches also need to have large power, the corresponding cost of the switches is relatively high, and the switches may bring about additional losses, thereby affecting the efficiency. In addition, in the third solution, the adjustable range and adjustable step are fixed and cannot be changed, or at least cannot be arbitrarily changed and adjusted. A fourth solution is to use a dielectric switch-type MEMS capacitor. Generally, a contact arm is located at one end of the capacitor, and when the circuit is applied with a relatively high direct current bias, an electrostatic attraction force will be generated between the contact arm and the other end of the capacitor, which brings about difficulties to the turning on of the switch capacitor. Moreover, due to bending and deformation of a contact, the capacitance is relatively decreased when the capacitor is turned off. With regard to the described various problems existing in the adjustable capacitor, developing an adjustable capacitor which has an arbitrarily-adjustable capacitance value and step, and has a high Q value, high voltage withstand value, small volume and low cost is a subject worthy of in-depth study.

SUMMARY

With regard to the defects of an existing adjustable capacitor, some embodiments of the present disclosure provide an adjustable capacitor with a high Q value, high voltage resistant value, small volume and low cost.

The adjustable capacitor of some embodiments of the present disclosure comprises a lower plate A, a movable plate B, an upper plate C, a fixed apparatus D and one or more connecting conductors E; wherein the lower end of the fixed apparatus D is fixedly connected to the lower plate A, the upper end of the fixed apparatus D is fixedly connected to the upper plate C, the movable plate B is provided with a structure B4 which is able to move freely in parallel in cooperation with the fixed apparatus D, the movable plate B is mounted on the fixed apparatus D by means of the structure B4, and is able to move up and down along the fixed apparatus D;

the lower plate A is provided with a lower electrode A1, and the movable plate B is provided with a movable electrode B1 and adjustment electrodes B2;

the lower electrode A1 and the movable electrode B1 form a unit capacitor, and the lower electrode A1 and the movable electrode B1 are isolated by means of a dielectric;

the upper plate C is provided with an upper electrode C1 and adjustment electrodes C2; two ends of each of the one or more connecting conductors E are respectively electrically connected to the upper electrode C1 and the movable electrode B1;

the adjustment electrodes C2 and the adjustment electrodes B2 constitute adjustment units, and the adjustment electrodes C2 and the adjustment electrodes B2 are isolated by means of a dielectric; and in a working state, the lower electrode A1 is constantly applied with a working voltage, the working voltage generates an electrostatic attraction force on the movable electrode B1, and an electrostatic attraction force of the adjustment electrodes C2 on the adjustment electrodes B2 is adjusted by controlling an adjustable voltage applied to the adjustment electrodes C2, or by adjusting areas, spacings and/or materials of the adjustment electrodes C2, so that a magnitude relationship between the attraction force of the lower electrode A1 on the movable plate B and the attraction force of the adjustment electrodes C2 on the movable plate B changes, thereby enabling the movable plate B to move up and down along the fixed apparatus D to adjust a capacitance value of the MEMS structure-based adjustable capacitor.

In some exemplary embodiments, the lower electrode A1 and the movable electrode B1 form a unit capacitor, and the lower electrode A1 is provided with one or more dielectric isolation layers A2 for isolating the lower electrode A1 from the movable electrode B1.

In some exemplary embodiments, the adjustment electrodes C2 and the adjustment electrodes B2 constitute adjustment units, the adjustment electrodes C2 are provided with dielectric isolation layers C3 for isolating the adjustment electrodes C2 from the adjustment electrodes B2, the adjustment electrodes C2 do not overlap with the movable electrode B1 and the lower electrode A1, and the adjustment electrodes B2 do not overlap with the upper electrode C1 and the lower electrode A1.

In some exemplary embodiments, the lower plate A is made of a dielectric material, a metal conductor covered or embedded on the surface of the dielectric material of the lower plate A forms the lower electrode A1, one or more dielectric isolation layers A2 are provided on the surface of the lower electrode A1, for isolating the lower electrode A1 from the movable electrode B1, and also for adjusting the capacitance value and a Q value of the MEMS structure-based adjustable capacitor.

In some exemplary embodiments, the movable plate B is made of a dielectric material, a structure B4 which is able to move freely in parallel in cooperation with the fixed apparatus D is provided in the middle of the movable plate B, and the movable plate B is sleeved on the fixed apparatus D by means of the movable plate B itself or by means of the structure B4; and metal conductors covered or embedded on the surface of the dielectric material of the movable plate B form the movable electrode B1 and the adjustment electrodes B2, the adjustment electrodes B2 are distributed on the periphery of the movable electrode B1, the adjustment electrodes and the movable electrode B1 are isolated from one another by means of a dielectric, the movable electrode B1 has the same shape as the lower electrode A1 and the upper electrode C1, and is aligned with the lower electrode A1 and the upper electrode C1 on a vertical plane, and the adjustment electrodes B2 and the adjustment electrodes C2 have the same shape, and are aligned on the vertical plane.

In some exemplary embodiments, the upper plate C is made of a dielectric material, a metal conductor covered or embedded on the surface of the dielectric material of the upper plate C forms the upper electrode C1, metal conductors covered or embedded on the surfaces of the dielectric material at the periphery of the upper electrode C1 form the adjustment electrodes C2, the upper electrode C1 and the adjustment electrodes C2 are isolated from one another by means of the dielectric material, dielectric isolation layers C3 are provided on the surfaces of the adjustment electrodes C2, the upper plate C is provided with a control layer C4, each of the adjustment electrodes C2 is connected to one end of a switch in a control layer C4, and the other end of the switch in the control layer C4 is connected to an adjustable voltage pin of the adjustable unit capacitor.

In some exemplary embodiments, the fixed apparatus D has one end fixed to the upper electrode C1 of the upper plate C, and the other end fixed to the lower electrode A1 of the lower plate A, and is used for supporting the upper plate C and the lower plate A and maintaining the upper plate C and the lower plate A parallel, and a fixing method of the fixed apparatus D comprises welding, pressing or bonding.

In some exemplary embodiments, the one or more connecting conductors E consist of 1 to M connecting conductors; 1 to M slots are correspondingly provided on the upper surface of the movable electrode B1, and 1 to M slots are correspondingly provided on the lower surface of the upper electrode C1; one end of each of the 1 to M connecting conductors is electrically connected to a corresponding slot of the 1 to M slots on the lower surface of the upper electrode C1, and the other end of each of the 1 to M connecting conductors is electrically connected to a corresponding slot of the 1 to M slots on the upper surface of the movable electrode B1; and the 1 to M connecting conductors have equal lengths, so that the movable plate B is kept parallel to the upper plate C and the lower plate A in a natural state.

In some exemplary embodiments, the one or more connecting conductors E are not short-circuited to the adjustment electrodes C2 and the adjustment electrodes B2 in a static state or a moving state; and the one or more connecting conductors E have extension and retraction performances with extending forces and elastic forces remaining unchanged, and have sizes which are able to satisfy that the movable plate B is able to be in close contact with the upper plate C when being compressed, and is able to be in close contact with the lower plate A when being extended downwards.

In some exemplary embodiments, the one or more connecting conductors E, the lower electrode A1, the movable electrode B1, the adjustment electrodes B2, the upper electrode C1, and the adjustment electrodes C2 are made of metal materials, and substrate materials of the upper plate C, the movable plate B and the lower plate A are dielectric materials.

In some exemplary embodiments, an electrostatic attraction force Fx is generated on the movable electrode B1 by the lower electrode A1 after the lower electrode A1 is applied with a working voltage, and an electrostatic attraction force Fs generated on the adjustment electrodes B2 by the adjustment electrodes C2 after the adjustment electrodes C2 are applied with an adjustable voltage, and in a case where Fs is smaller than Fx, the movable plate B moves towards and finally gets close to the lower plate A, and at this time, the capacitance value of the adjustable unit capacitor reaches the maximum; in a case where Fs is greater than Fx, the movable plate B moves towards and finally gets close to the upper plate C, and at this time, the capacitance value of the adjustable unit capacitor reaches the minimum; and in a case where the adjustable voltage applied to the adjustment electrodes C2 is zero and the working voltage applied to the lower electrode A1 is not zero, the movable plate B moves towards the lower plate A, to keep the adjustable unit capacitor in a state of a maximum capacitance value.

In some exemplary embodiments, the unit capacitor and the adjustment units form an adjustable unit capacitor by means of the movable plate B, the lower electrode A1 of the adjustable unit capacitor is connected to a working voltage pin, the upper electrode C1 is connected to a grounding pin, each of the adjustment electrodes C2 is connected to one end of a switch on a control layer C4 by means of a metal via hole, and the other end of the switch in the control layer C4 is connected to an adjustable voltage pin; and a switch data transceiving bus is connected to a control pin, and a processor controls the on/off of the switch and the voltage on the adjustable voltage pin by means of the switch data transceiving bus, so as to control the movement of the movable electrode B1 in the adjustable unit capacitor, thereby changing the capacitance value of the adjustable unit capacitor.

In some exemplary embodiments, the upper plate C and the lower plate A are packaged by using a non-metallic material, two pins of a combined capacitor are led out, and ground is marked, the control pin is located at a vacated position of a capacitor pin or a gap position in a grounding pin, and finally packaging and sealing are performed; or the upper plate C and the lower plate A serve as a part of device packaging, and are externally added with a packaging material to achieve packaging of the MEMS structure-based adjustable capacitor.

In some exemplary embodiments, by setting parameters of the shape and thickness of the one or more dielectric isolation layers A2 covering the lower electrode A1, two paths of signals are enabled to have equal amplitudes and opposite phases, so that the two paths of signals are able to cancel each other or resonance generated after a radio frequency signal is applied is prevented.

In some exemplary embodiments, N adjustable unit capacitors constitute a combined capacitor.

In some exemplary embodiments, a first composition manner of the combined capacitor is that N adjustable unit capacitors are superposed longitudinally to form the combined capacitor, wherein the lower electrode A1 of each unit capacitor is connected to a working voltage pin of the combined capacitor by means of a lead-out wire, and the upper electrode C1 is connected to a grounding pin by means of a lead-out wire, each of the adjustment electrodes C2 is connected to one end of a switch of the unit capacitor where the adjustment electrodes C2 are located, the other end of the switch is led out to a corresponding one of N adjustable voltage control pins of the combined capacitor, N lower electrodes A1 are connected to a working voltage pin, and N upper electrodes C1 are connected to the ground.

In some exemplary embodiments, a second composition manner of the combined capacitor is that: in the combined capacitor, N upper electrodes C1 are distributed on one upper plate C, and are connected to a grounding pin of the combined capacitor by means of leads, N lower electrodes A1 are distributed on one lower plate A, and are connected to a working voltage pin of the combined capacitor by means of leads; and each of N adjustment electrodes C21 to C2N are connected to one end of a corresponding one of N switches distributed on a control layer C4 through metal via holes, the other end of each of the N switches is connected to a corresponding one of N adjustable voltage control pins of the combined capacitor, and all the leads do not overlap with the upper electrode C1, the movable electrode B1 and the lower electrode A1.

In some exemplary embodiments, a third composition manner of the combined capacitor is that M combined capacitors are first laterally expanded according to the second composition manner, and then N of the M combinations are longitudinally expanded according to the first composition manner to form the combined capacitor.

In some exemplary embodiments, a bus controller of each of N switches of a control layer C4 in the combined capacitor is connected to a control bus, each of the N switches connected to the bus is allocated with an address, a bus control protocol is used for specifically identifying each switch by means of the address, and an external or internal main controller controls the on/off of each switch by means of the address; the bus is connected to a corresponding bus control pin outside a package of the MEMS structure-based adjustable capacitor by means of a corresponding conductive wire, the conductive wire does not overlap with the upper electrode C1 of an upper plate electrode layer, the movable electrode B1 of the movable plate B and the lower electrode A1 of a lower plate electrode layer, and an external processor controls the on/off of the N switches according to the address of each switch, so as to achieve step adjustment of the combined capacitor and arbitrary adjustment of the capacitance value of the combined capacitor; wherein an internal controller is connected to an external controller by means of the bus, so as to transfer a magnitude of a required capacitance value of the MEMS structure-based adjustable capacitor.

In some exemplary embodiments, a usage mode of N adjustable unit capacitors in the combined capacitor is: a working mode during initial use or reset use is: sequentially controlling, by a controller, a switch matrix so that an adjustable voltage is applied or not applied to adjustment electrodes on an upper plate C of each adjustable unit capacitor, and a working voltage is applied or not applied to a lower electrode A1 of each lower plate A, such that a capacitance value of each of the N adjustable unit capacitors in the combined capacitor is a minimum value or a maximum value, to complete initial set or reset;

after power on, in a case where the capacitance value of the combined capacitor reaches the minimum, applying a working voltage to all the lower electrodes A1 of the combined capacitor, and adjusting the total capacitance value of the combined capacitor to a desired capacitance value by adjusting the controller to control on/off of switches of the switch matrix and adjusting or not adjusting a magnitude of the adjustable voltage, while maintaining states of all switches of the switch matrix and storing the states of all switches of the switch matrix;

after power on, in a case where the capacitance value of the combined capacitor reaches the maximum, by controlling to apply an adjustable voltage to all adjustment electrodes of the combined capacitor and to apply a working voltage to all the lower electrodes A1, controlling on/off of switches of the switch matrix and adjusting or not adjusting a magnitude of the adjustable voltage, thereby adjusting the total capacitance value of the combined capacitor to a desired capacitance value, while maintaining states of all switches of the switch matrix, and storing the states of all switches of the switch matrix;

in a case where the combined capacitor has been adjusted to a desired capacitance value, after power on again, by recalling the states of the switches of the switch matrix from a main controller, adjusting the switch matrix to an on/off state of the switch matrix of the desired capacitance value of the combined capacitor, and then applying the working voltage of the lower electrodes A1 and the adjustable voltage of the adjustment electrodes, thereby achieving the desired capacitance value of the combined capacitor, wherein after achieving the desired capacitance value, the capacitance value of the combined capacitor is able to be further adjusted to a new capacitance value by controlling on/off of corresponding switches in the switch matrix by the controller, and in a case where adjustment or change of a power on sequence and the capacitance value of the adjustable unit capacitor, and the initial capacitance value have an effect on use of a circuit, designing a protection measure in the circuit applying the combined capacitor, for example, enabling the circuit to be in a working state after adjusting the capacitance value of the adjustable capacitor to the required capacitance value.

In some exemplary embodiments, a package housing of the combined capacitor packages the N adjustable unit capacitors in a sealed space, and an external working voltage pin, a grounding pin, adjustable voltage pins and a control pin of the combined capacitor are respectively connected to the lower electrodes A1, the upper electrodes C1, the adjustment electrodes and control switches on the upper plate C and the lower plate A through leads and via holes, so as to achieve packaging of the N adjustable unit capacitors.

In some exemplary embodiments, a material coating is welded on the surfaces of a power supply pin, the grounding pin and the control pin, and the package housing is of a non-metallic material.

In some exemplary embodiments, each adjustable unit capacitor in the combined capacitor is able to be individually adjusted, and a plurality of adjustable unit capacitors is able to be adjusted in any combination, so as to achieve a plurality of step adjustments of the combined capacitor, and a exemplary implementation is that an internal or external processor controls on/off of N radio frequency switches in a control layer C4, so as to adjust the capacitance values of the N adjustable unit capacitors, thereby adjusting the capacitance value of the combined capacitor.

The beneficial effects of the embodiments of the present disclosure are: the MEMS structure-based adjustable capacitor provided in the embodiments of the present disclosure not only has a high Q value, but also has high voltage withstand and current withstand capabilities. By means of packaging a plurality of unit capacitors in a package, the continuous and step adjustment of the capacitance value of a combined capacitor can be achieved. The capacitance value of the MEMS structure-based adjustable capacitor can be programmable and adjustable by means of an external or internal processor, having good application environment adaptability. The adjustment electrodes are movable electrodes with fixed potential states, thereby avoiding the effect of direct-current bias of a radio frequency circuit at two ends of a variable capacitor on the movement of a switch arm. Different from a conventional variable capacitor, the movable electrode moves horizontally up and down, and the electrode itself has no deformation, which can reduce parasitic capacitance and has a higher capacitance change linearity. The adjustment electrodes are constantly in an electric field blocking state, reducing the effect of external mechanical vibration. A semiconductor is welded with a dielectric material by using a low-temperature solder, while achieving wafer level packaging.

Hereinafter, some embodiments of the present disclosure will be further described in detail in conjunction with the accompanying drawings.

DETAILED DESCRIPTION OF THE EMBODIMENTS

Figure 1:
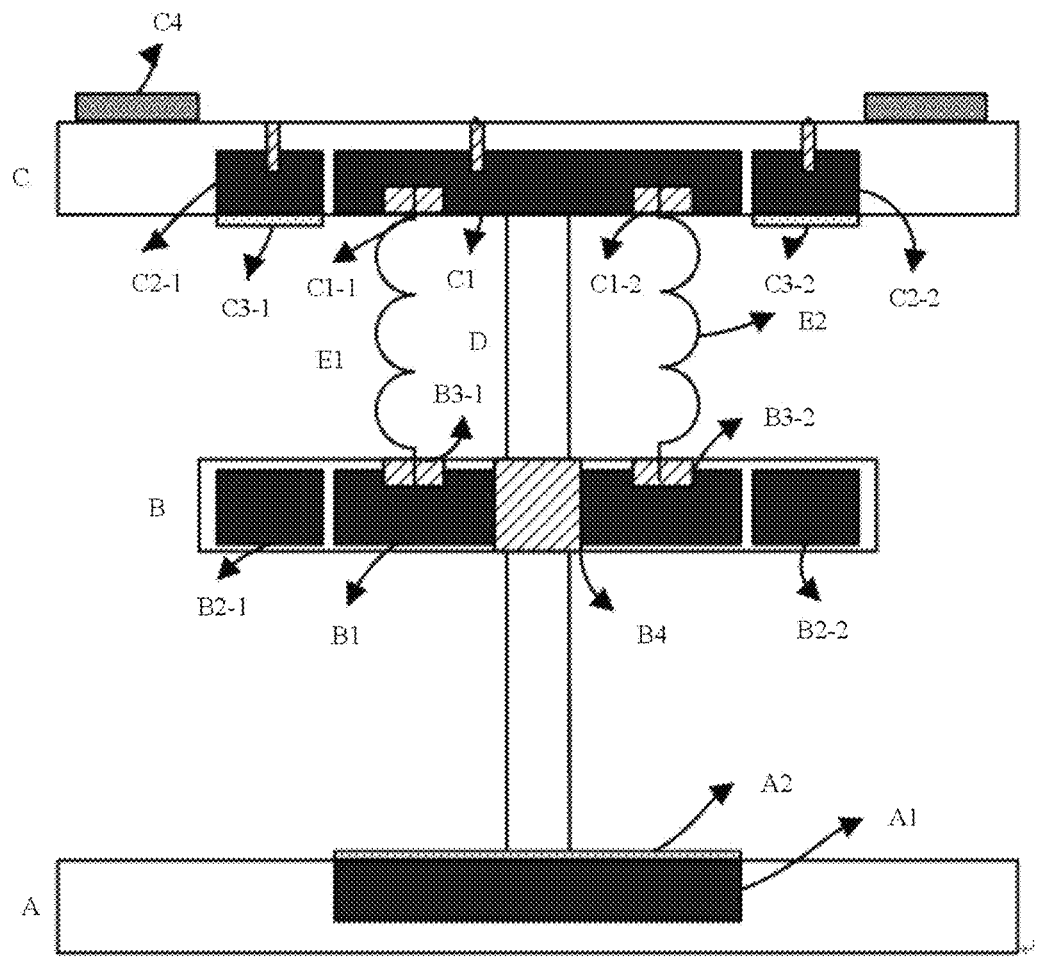
FIG. 1 is an overall sectional view of composition of a variable capacitor in Embodiment 1 of the present disclosure.

In order to further illustrate the technical means adopted in some embodiments of the present disclosure for achieving a predetermined purpose and the effects thereof, exemplary embodiments, structural features and effects thereof in the present disclosure will be described in detail below in conjunction with the accompanying drawings and embodiments.

Hereinafter, the technical solutions in the embodiments of the present disclosure will be described clearly and completely with reference to the accompanying drawings of the embodiments of the present disclosure. Obviously, the embodiments as described are only some of the embodiments of the present disclosure, and are not all of the embodiments. Based on the embodiments of the present disclosure, all the other embodiments obtained by a person having ordinary skill in the art without involving any inventive effort shall fall thin the scope of protection of the present disclosure.

In the description of some embodiments of the present disclosure, it should be understood that orientation or position relationships indicated by terms such as "center", "upper", "lower", "front", "rear", "left", "right", "vertical", "horizontal", "aligning", "overlapping", "bottom", "inner", "outer", etc. are orientation or position relationships based on the accompanying drawings, are only used to facilitate the description of some embodiments of the present disclosure and to simplify the description, rather than indicating or implying that the apparatuses or element referred to thereby must have a specific orientation, and be constructed and operated in the specific orientation, and therefore said terms cannot be understood as a limitation to some embodiments of the present disclosure.

The terms "first" and "second" are only used for descriptive purposes, and cannot be understood as indicating or implying relative importance or implicitly indicating the number of indicated technical features. Thus, features defined by "first" and "second" may explicitly or implicitly comprise one or more of the features. In the description of some embodiments of the present disclosure, unless otherwise specified, "a plurality of" means two or more.

Embodiment 1

Some embodiments of the present disclosure provide an MEMS structure-based adjustable capacitor, comprising a lower plate A, a movable plate B, an upper plate C, a fixed apparatus D and one or more connecting conductors E. The lower end of the fixed apparatus D is fixedly and vertically connected to the lower plate A, and the upper end of the fixed apparatus D is fixedly and vertically connected to the upper plate C. A slot or a through hole B4 is provided in the middle of the movable plate B, and the movable plate B is provided in the middle of the fixed apparatus D through the slot or through hole B4 and is able to move up and down on the fixed apparatus D. The lower plate A is provided with a lower electrode A1, and the movable plate B is provided with a movable electrode B1 and adjustment electrodes B2. The lower electrode A1 and the movable electrode B1 constitute a unit capacitor, and the unit capacitor is a parallel plate capacitor. The upper plate C is provided with an upper electrode C1 and adjustment electrodes C2. Two ends of each of the one or more connecting conductors E are respectively electrically connected to the upper electrode C1 and the movable electrode B1. The adjustment electrodes C2 and the adjustment electrodes B2 constitute adjustment units.

In the embodiment, the connecting conductors E comprise a connecting wire conductor E1 and a connecting wire conductor E2. A slot B3-1 and a slot B3-2 are provided on the upper surface of the movable electrode B1, and a slot C1-1 and a slot C1-2 are provided on the lower surface of the upper electrode C1. One end of the connecting wire conductor E1 is electrically connected to the slot C1-1 on the upper electrode C1, and the other end of the connecting wire conductor E1 is electrically connected to the slot B3-1 on the movable electrode B1. One end of the connecting wire conductor E2 is electrically connected to the slot C1-2 on the upper electrode C1, and the other end of the connecting wire conductor E2 is electrically connected to the slot B3-2 on the movable electrode B1. In this way, the movable electrode B1 maintains electrical connection with the upper electrode C1, and a circuit between the movable electrode B1 and the upper electrode C1 is in a connected state.

The adjustment electrodes B2 comprise an adjustment electrode B2-1 and an adjustment electrode B2-2. The adjustment electrodes C2 comprise an adjustment electrode C2-1 and an adjustment electrode C2-2, the adjustment electrode C2-1 is provided opposite to the adjustment electrode B2-1, and the adjustment electrode C2-2 is provided opposite to the adjustment electrode B2-2.

A control layer C4 is provided on the upper surface of the upper plate C, and the control layer C4 comprises a connecting lead C4-2, a connecting lead C4-3 and a switch C4-1. The connecting lead C4-2 connects the upper electrode C1 to a grounding pin of a package of the unit capacitor.

The connecting lead C4-3 connects the adjustment electrode C2-1 and the adjustment electrode C2-2 together and then connects the adjustment electrode C2-1 and the adjustment electrode C2-2 to one end of the switch C4-1, and the other end of the switch C4-1 is connected to an adjustable voltage pin of the unit capacitor.

One or more dielectric isolation layers A2 are provided on the upper surface of the lower electrode A1.

Dielectric isolation layers C3 are provided on lower surfaces of the adjustment electrodes C2.

Specifically, one end of the fixed apparatus D is fixed at a central position of the lower electrode A1 of an electrode layer of the lower plate A, and maintains perpendicular to the lower electrode A1, and the other end of the fixed apparatus D is fixed at a central position of the upper electrode C1 of an electrode layer of the upper plate C, and maintains perpendicular to the upper electrode C1. The fixed apparatus D fixes and supports the upper plate C and the lower plate A, and enables the upper plate C and the lower plate A to maintain parallel to each other and be separated by a certain spacing. The movable plate B is able to move up and down between the upper plate C and the lower plate A under the action of an electrostatic force. The movement of the movable plate B causes a change in the distance between the movable electrode B1 and the lower electrode A1, thereby changing the magnitude of the unit capacitor. The adjustment electrodes C2 and the adjustment electrodes B2 constitute adjustment units. The adjustment electrodes C2 are located at the periphery of the upper electrode C1 and are isolated from the upper electrode C1 by means of a dielectric material, the adjustment electrodes C2 do not overlap with the movable electrode B1 and the lower electrode A1, and the adjustment electrodes C2 are isolated from the adjustment electrodes B2 of the movable plate B by means of the dielectric isolation layers C3. The adjustment electrodes B2 are located at the periphery of the movable electrode B1, the adjustment electrodes B2 are isolated from the movable electrode B1 by means of a dielectric material, the adjustment electrodes B2 do not overlap with the upper electrode C1 and the lower electrode A1, and the lower electrode A1, the movable electrode B1, the adjustment electrodes B2, the upper electrode C1 and the adjustment electrodes C2 are made of metal.

The lower plate A, the movable plate B and the upper plate C are made of monocrystalline silicon.

In this embodiment, the capacitance value of the adjustable capacitor is specifically determined by the areas of the lower electrode A1 and the movable electrode B1, the number of layers and thickness of the dielectric isolation layers A2 covered on the lower electrode A1, and the dielectric constant of the dielectric isolation layer A2, and the spacing between the lower electrode A1 and the movable electrode B1. The specific calculation process is as follows.

In this embodiment, there is only one dielectric isolation layer A2 covered on the lower electrode A1. There may also be multiple dielectric isolation layers A2. The dielectric isolation layer A2 has a thickness of $d_1$ and a dielectric constant of $\varepsilon_1$. The air distance between the movable electrode B1 and the lower electrode A1 is $d_2$, and the dielectric constant of air is $\varepsilon_2$. The capacitances are $C_1$ and $C_2$ respectively. In this embodiment, the areas of the movable electrode B1 and the lower electrode A1 are both S. According to a calculation formula of a parallel plate capacitor:

$$C_1 = \varepsilon_0 \varepsilon_1 \frac{S}{d_1} \quad (1)$$

$$C_2 = \varepsilon_0 \varepsilon_2 \frac{S}{d_2} \quad (2)$$

In this embodiment, an adjustable unit capacitance C is a sum of series values of C1 and C2, and is:

$$C = \frac{C_1 C_2}{C_1 + C_2} = \frac{\varepsilon_0 \varepsilon_1 \varepsilon_2 S}{\varepsilon_2 d_1 + \varepsilon_1 d_2}, \quad (3)$$

wherein d2 is the spacing between the movable electrode B1 and the lower electrode A1, and the value of d2 can be adjusted by adjusting the electrostatic force. A specific method for adjusting d2 is as follows.

In this embodiment, it is assumed that after a working voltage V is applied to the lower electrode A1 on the electrode layer of the lower plate A, an electrostatic force generated on the movable electrode B1 of the movable plate B is Fx. After an adjustable voltage V1 is applied to the adjustment electrodes C2 on the electrode layer of the upper plate C, an electrostatic force generated on the adjustment electrodes B2 of the movable plate B is Fs. The self-gravity of the movable plate B is Fg. A friction force between the movable plate B and the fixed apparatus D when the movable plate B moves on the fixed apparatus D is Fz. A resultant force of tensile forces of the connecting wire conductor E1 and the connecting wire conductor E2 is uniform throughout the whole extending process and the tensile force value is Fl. Elastic forces of the connecting wire conductor E1 and the connecting wire conductor E2 are uniform throughout the whole compressing process of the connecting wire conductors E1 and E2, and the values of elastic forces are both Ft. If Fs>Fx+Fg+Fz+Ft, the movable plate B is subjected to an upward electrostatic force and is pulled to finally get close to the upper plate C, and at this time, the value of d2 reaches the maximum, and it can be known from formula 3 that when the value of d2 reaches the maximum and other parameters are unchanged, the capacitance value C of the adjustable unit capacitor reaches the minimum. If Fx+Fg>Fs+Fl+Fz, the movable plate B is subjected to a downward electrostatic tensile force and moves to and finally gets close to the lower plate A, and at this time, the value of d2 reaches the minimum, it can be known from formula 3 that when the value of d2 reaches the minimum and other parameters are unchanged, the capacitance value C of the adjustable unit capacitor reaches the maximum. If Fs+Fl=Fx+Fg+Ft, the movable plate B is located at an uncertain position between the upper plate C and the lower plate A, and at this time, the capacitance value of the adjustable unit capacitor is an intermediate uncertain value. In order to prevent the capacitance value of the adjustable capacitor from being in an uncertain state, the state of Fs+Fl=Fx+Fg+Ft needs to be avoided by controlling the voltage value of the adjustable voltage, thereby preventing the capacitance value of the adjustable unit capacitor from being in an uncertain state.

In addition, in cases where the adjustable capacitor in this embodiment is subjected to external mechanical disturbance or vibration, d2 may have a tiny change due to the vibration. Assuming that the change amount is $\Delta d_2$, correspondingly, the change amount of the total capacitance C is $\Delta C$, and according to formula 3 which is a function about C and takes $d_2$ as an independent variable, $c=f(d_2)$, it can be obtained by differentiating:

$$\Delta C = \frac{-\varepsilon_0 \varepsilon_1^2 \varepsilon_2 S}{(\varepsilon_2 d_1 + \varepsilon_1 d_2)^2} \Delta d_2$$

then it can be calculated that the percentage of change of the total capacitance is:

$$\left|\frac{\Delta C}{C}\right| = \frac{\varepsilon_1 |\Delta d_2|}{\varepsilon_2 d_1 + \varepsilon_1 d_2}.$$

According to the described formula, it can be concluded that $$\left|\frac{\Delta C}{C}\right|$$

is much smaller than $$\left|\frac{\Delta d_2}{d_2}\right|,$$

which indicates that the structure can effectively overcome the effect of external mechanical vibration, and the effect of external disturbance on the capacitance value can be ignored.

In this embodiment, a formula for calculating the Q value of the adjustable capacitor is as follows: Q=1/wCR, wherein R is an equivalent resistance value of the adjustable capacitor, and this value is mainly composed of a resistance R1 from the lower electrode A1 to the capacitor pin, a resistance value R2 of the lower electrode A1, a resistance value R3 of the movable electrode B1, a resistance value R4 of the upper electrode C1, and a sum R5 of resistance values of the connecting wire conductor E1 and the connecting wire conductor E2, i.e., R=R1+R2+R3+R4+R5. In order to ensure that the value of R reaches the minimum, it needs to be ensured as far as possible that the resistance values of all parts are the minimum, and in this case, the Q value of the adjustable unit capacitor can be the minimum in this embodiment.

In the present embodiment, the upper electrode C1, the movable electrode B1 and the lower electrode A1 have identical shape and size, and are all rectangular. The adjustment electrodes C2 on the upper plate C are composed of the adjustment electrode C2-1 and the adjustment electrode C2-2, and the adjustment electrodes B2 on the movable plate B are composed of the adjustment electrode B2-1 and the adjustment electrode B2-2. The adjustment electrode C2-1 and the adjustment electrode C2-2 are symmetrically distributed at two sides of the upper electrode C1. The adjustment electrode B2-1 and the adjustment electrode B2-2 are symmetrically distributed at two sides of the movable electrode B1. The adjustment electrode C2-1 and the adjustment electrode B2-1 overlap in the vertical direction. The adjustment electrode C2-2 and the adjustment electrode B2-2 overlap in the vertical direction. One end of the fixed apparatus D is fixed at a central position of the upper electrode C1, and the other end of the fixed apparatus D is fixed at a central position of the lower electrode A1. A slot or through hole B4 is provided at a central position of the movable plate B, the shape of the slot or through hole B4 is the same as the cross-sectional shape of the fixed apparatus D, and the size of the slot or through hole B4 is slightly larger. Fixed points of the two connecting wire conductors, i.e., the connecting wire conductor E1 and the connecting wire conductor E2 are on a central balance line of the movable plate B. When the connecting wire conductor E1 and the connecting wire conductor E2 are in a natural suspension state, the movable plate B is naturally parallel to the upper plate C and the lower plate A. The design of the described sizes and appearances ensures that after the adjustment electrode C2-1 and the adjustment electrode C2-2 are powered on, the electrostatic attraction forces on the adjustment electrode B2-1 and the adjustment electrode B2-2 are uniform and symmetrical, and after the lower electrode A1 is powered on, the electrostatic force generated on the movable electrode B1 is uniform and symmetrical, thereby ensuring that the movable plate B is able to move stably when moving up and down between the upper plate C and the lower plate A, and the friction force generated between the movable plate B and the fixed apparatus D reaches the minimum.

Figure 2:
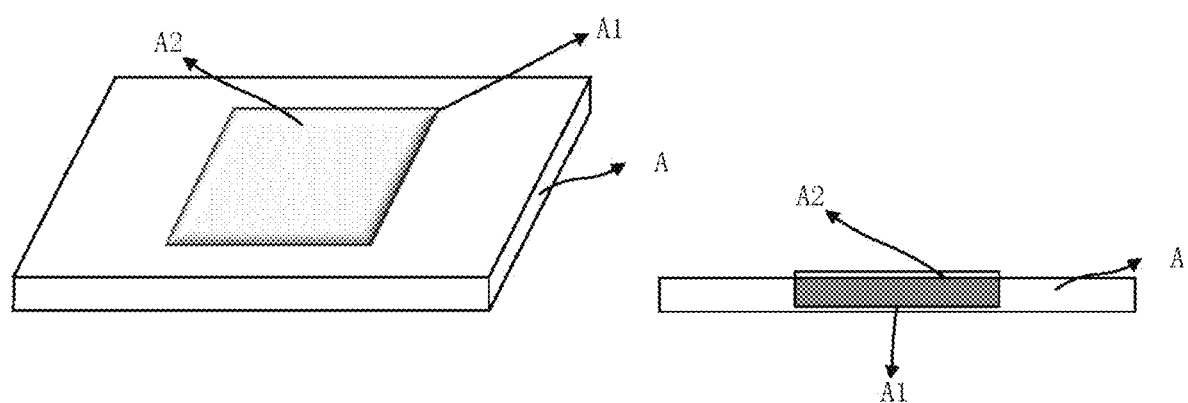
FIG. 2 is structural diagrams of a lower plate A of the adjustable capacitor in Embodiment 1 of the present disclosure.

FIG. 2 is a structural oblique view and a sectional view of the lower plate A of the adjustable capacitor in the present embodiment. An implementation process of the lower plate A in the present embodiment is: first, forming a substrate of the lower plate A on monocrystalline silicon, etching a shallow slot in a capacitor forming region, sputtering metal in the slot to form the lower electrode A1 of the adjustable capacitor, and then depositing a dielectric material on the lower electrode A1 of the adjustable capacitor so as to form a dielectric isolation layer A2. The number of layers of the deposited dielectric material can be selected according to a capacitance value and a Q value, which need to be achieved, of the MEMS structure-based adjustable capacitor. There is one dielectric isolation layer deposited in the present embodiment, and there may also be multiple dielectric isolation layers. The surface of the deposited dielectric isolation layer A2 is a smooth surface, so that when the movable electrode B1 gets close to the lower electrode A1, the dielectric isolation layer A2 and the movable electrode B1 can be in close contact, thereby enhancing the anti-vibration capability of the capacitor in this state. Moreover, the selection of the thickness value of the dielectric isolation layer A2 also needs to refer to a working frequency band of the adjustable capacitor, so that the resonant frequency of the adjustable capacitor is different from the working frequency of the capacitor, thereby avoiding the generation of resonance. When the lower electrode A1 is simultaneously applied with a radio frequency signal and a direct current signal, oscillation signals have equal amplitude and opposite phases which cancel one another, or prevent resonance generated after application of the radio frequency signal. Moreover, the resistance value of a metal conductor of the lower electrode A1 also affects the Q value of the adjustable capacitor, the smaller the resistance value is, the greater the Q value of the adjustable capacitor is, and also the resistance values and sizes of the lower electrode A1 and the dielectric isolation layer A2 covered thereon also affect the voltage withstand and current withstand capabilities of the lower electrode A1 of the adjustable capacitor.

Figure 3:
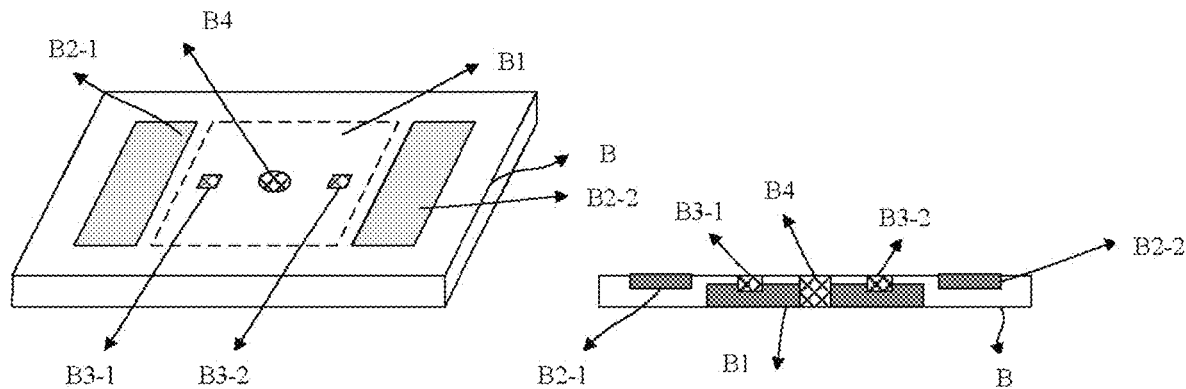
FIG. 3 is structural diagrams of an embodiment of a movable plate B of the adjustable capacitor in Embodiment 1 of the present disclosure.

FIG. 3 is a structural oblique view and a cross-sectional view of the movable plate B of the adjustable capacitor in the present embodiment. The implementation process of the movable plate B in the present embodiment is as follows. The movable plate B is manufactured by using monocrystalline silicon as a substrate, shallow slots are respectively etched in a movable electrode region and adjustment electrode regions, metal is sputtered in the slots and then planarized, and metal is filled in the slots to form the movable electrode B1 and the adjustable electrodes B2 respectively. The area and shape of the movable electrode B1 are completely consistent with the area and shape of the lower electrode A1, so as to ensure that after the lower electrode A1 is powered on, the electrostatic forces on the movable electrode B1 are uniformly and symmetrically distributed at all force bearing points of the movable electrode B1. The areas and shapes of the adjustment electrode B2-1 and the adjustment electrode B2-2 are completely consistent with the areas and shapes of the adjustment electrode C2-1 and adjustment electrode C2-2, so as to ensure that after the adjustment electrodes C2 are powered on, the electrostatic forces on the adjustment electrodes B2 are uniformly and symmetrically distributed at all force bearing points. A slot or through-hole B4 having the same cross-sectional shape as that of the fixed apparatus D is etched at the center of the movable plate B, the slot or through-hole cooperating with the fixed apparatus D to achieve stable upper and lower movement. On longitudinal central axes, symmetrical at two sides of the slot or through hole B4, of the movable plate B, a slot B3-1 and a slot B3-2 are arranged at positions where the connecting conductors are fixed. The depth of the slots should ensure that the connecting wire conductor E1 and the connecting wire conductor E2 after being compressed can be at least 50% hidden inside the slots B3-1 and B3-2 of the movable plate B, and that one end of the connecting wire conductor E1 and one end of the connecting wire conductor E2 are fixed inside the slot B3-1 and the slot B3-2 respectively, so that E1 and E2 are in electrical communication with the movable electrode B1, respectively.

Figure 4:
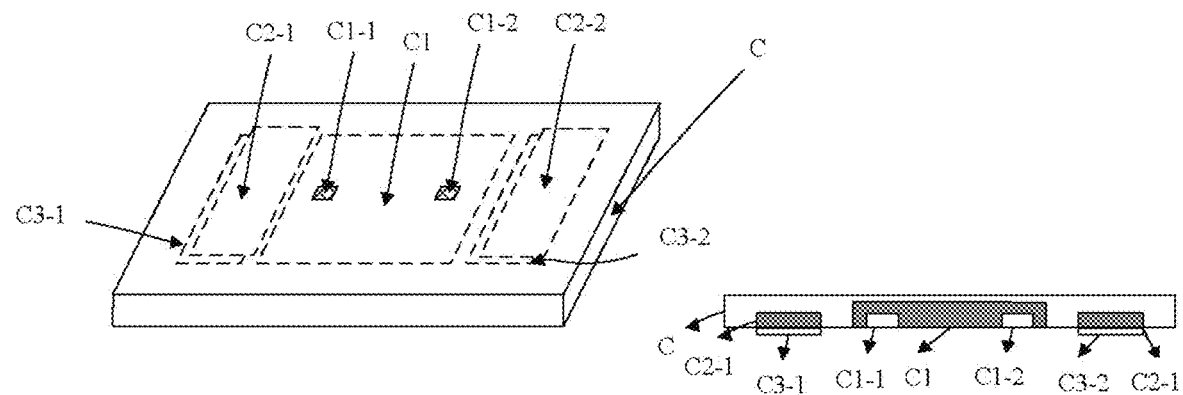
FIG. 4 is structural diagrams of an embodiment of an upper plate C of the adjustable capacitor in Embodiment 1 of the present disclosure.

FIG. 4 is a structural oblique view and a cross-sectional view of the upper plate C of the adjustable capacitor in the present embodiment. The implementation process of the upper plate C in the present embodiment is as follows. The upper plate C is manufactured by using monocrystalline silicon as a substrate, shallow slots are etched in an upper electrode region and adjustment electrode regions at two sides of the upper electrode region, after the shallow slots are formed, continue to drill in the middle of the adjustment electrode region to etch deep slots, then metal is sputtered in the slots and then planarized, and metal is filled in the slots. The metal in the upper shallow slots forms the upper electrode C1, the adjustment electrode C2-1 and the adjustment electrode C2-2 of the adjustable capacitor. The adjustment electrode C2-1 and the adjustment electrode C2-2 are arranged at positions opposite to the adjustment electrode B2-1 and the adjustment electrode B2-2.

The adjustment electrodes have similar shapes, so that after the adjustment electrodes C2 are applied with an adjustable voltage, electrostatic attraction forces on the force bearing points of the movable electrode B2 are uniformly and symmetrically distributed. Dielectrics are deposited on surfaces of the adjustment electrode C2-1 and the adjustment electrode C2-2 to form a dielectric isolation layer C3-1 and a dielectric isolation layer C3-2. The surfaces of the dielectric isolation layers C3 are smooth, and the dielectric isolation layers are used for isolating the adjustment electrodes C2 from the adjustment electrodes B2. A slot C1-1 and a slot C1-2 are etched at corresponding positions similar to the adjustment electrodes of the movable plate B and at two symmetrical sides on a transverse central axis of the upper electrode C1. The depth, length and width of the slots should ensure that the connecting wire conductor E1 and the connecting wire conductor E2, when being compressed, can be hidden in the slots by 50% or more in the slots. The other end of the connecting wire conductor E1 and the other end of the connecting wire conductor E2 are respectively fixed in the slot C1-1 and the slot C1-2, so that the connecting wire conductors E1 and E2 are in electrical communication with the upper electrode C1.

Figure 5:
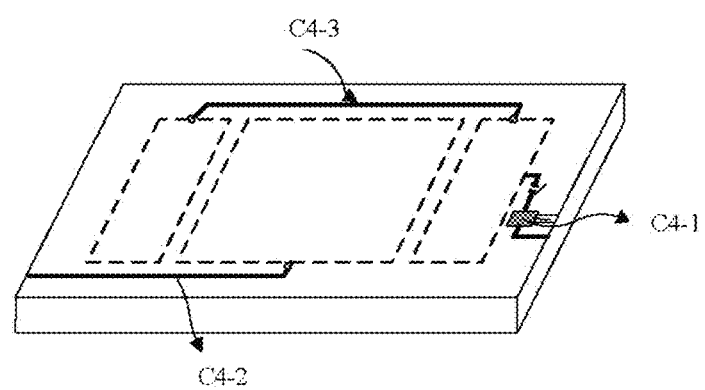
FIG. 5 is a structural diagram of an embodiment a control layer C4 of the upper plate C of the adjustable capacitor in Embodiment 1 of the present disclosure.

FIG. 5 is a sectional view of a control layer C4 of the upper plate C of the adjustable capacitor in the present embodiment. A control layer C4 is provided at the upper surface layer of the upper plate C. The control layer C4 is mainly distributed with a connecting lead C4-2, a connecting lead C4-3 and a switch C4-1. The connecting lead C4-2 is mainly used for connecting the upper electrode C1 to a grounding pin of a package of the capacitor. The function of the connecting lead C4-3 is to connect the adjustment electrode C2-1 and the adjustment electrode C2-2 together and then connect the adjustment electrode C2-1 and the adjustment electrode C2-2 to the switch C4-1. The other end of the switch C4-1 is connected to an adjustable voltage pin of the adjustable capacitor. Moreover, a data transceiving control bus of the switch C4-1 is connected to a control pin of the capacitor by means of a lead-out wire.

Figure 6:
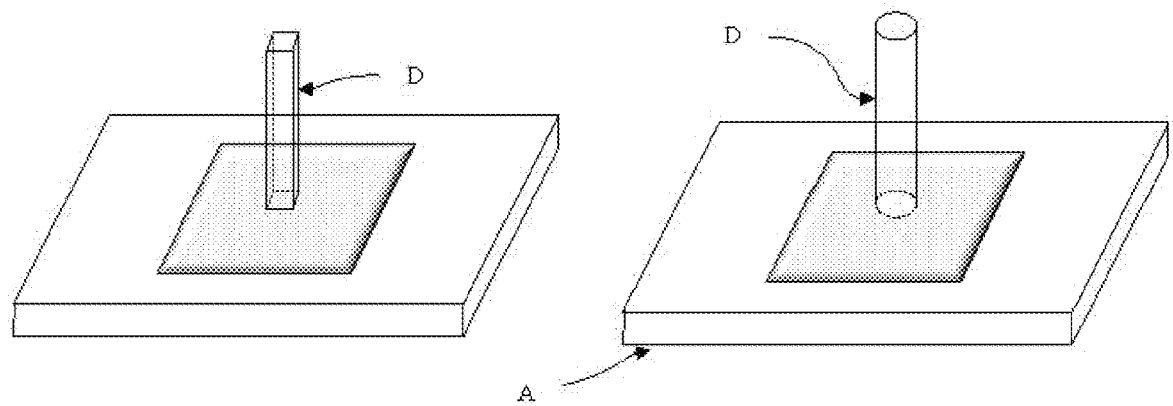
FIG. 6 is structural diagrams of a fixed apparatus D of the adjustable capacitor in Embodiment 1 of the present disclosure.

FIG. 6 is structural diagrams of an embodiment of the fixed apparatus D of the adjustable capacitor in the present embodiment. The exemplary implementation process of the fixed apparatus D is to form the fixed apparatus D by means of deposition or bonding. One end of the fixed apparatus D is fixed at the center of the lower electrode A1 of the lower plate A and is perpendicular to the lower plate A, and the other end of the fixed apparatus D is fixed at a central position of the upper electrode C1 of the upper plate C of the adjustable capacitor and is perpendicular to the upper plate C. The fixed apparatus D supports the upper plate C and the lower plate A between the upper plate C and the lower plate A, and enables the upper plate C and the lower plate A to maintain parallel. The fixing form of the fixed apparatus D comprises but is not limited to forms such as a fixed shaft, a fixed plate, a fixed cavity, and a fixed spring.

Figure 7:
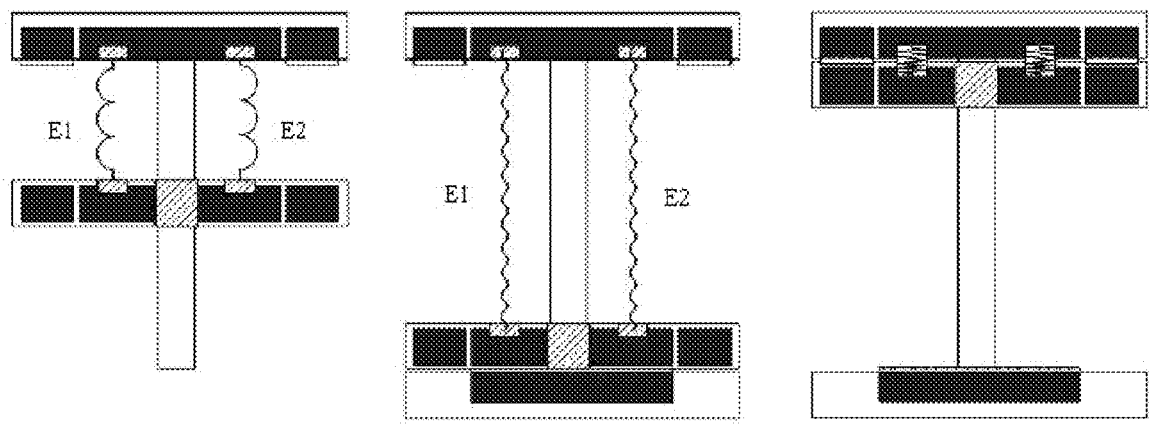
FIG. 7 is structural diagrams of the connecting wire conductors of the adjustable capacitor in Embodiment 1 of the present disclosure.

FIG. 7 is structural diagrams of an embodiment of the one or more connecting conductors E of the adjustable capacitor in the present embodiment. The connecting wire conductor E1 and the connecting wire conductor E2 are formed of metal conductors having extension and retraction performances. One end of the connecting wire conductor E1 is fixed in the slot B3-1, the other end of the connecting wire conductor E1 is fixed in the slot C1-1. One end of the connecting wire conductor E2 is fixed in the slot B3-2, and the other end of the connecting wire conductor E2 is fixed in the slot C1-2. It can be seen from the structural diagrams that there are three typical states of the connecting wire conductor E1 and the connecting wire conductor E2. A first state is that the connecting wire conductor E1 and the connecting wire conductor E2 are extended to the longest extent, and at this time, after a working voltage is applied to the lower electrode A1 of the lower plate A, a sum of an electrostatic force generated by the working voltage on the movable electrode B1 and the self-gravity of the movable plate B is greater than a sum of the friction force of the movable plate B, an upward extending force and electrostatic attraction forces of the adjustment electrodes C2-1 and C2-2 of the upper plate C on the movable plate B, and then the movable plate B is in close contact with the lower plate A. A second state is that the connecting wire conductor E1 and the connecting wire conductor E2 are compressed to the shortest state, at this time, after an adjustable voltage is applied to the adjustment electrode C2-1 and the adjustment electrode C2-2 of the upper plate C, an electrostatic force generated by the adjustable voltage on the adjustment electrode B2-1 and the adjustment electrode B2-2 of the movable plate B is greater than a sum of the self-gravity, the friction force and a downward elastic force of the movable plate B, and an electrostatic force of the lower electrode A1 of the lower plate A on the movable plate B, and in this case, the adjustment electrodes C2-1 and C2-2 of the upper plate C attract the movable plate B to be in close contact with the upper plate C. In this state, the connecting wire conductor E1 and the connecting wire conductor E2 are hidden inside the slot B3-1, slot B3-2, slot C1-1, and slot C1-2. A third state is that the connecting wire conductors E1 and E2 are in a state of any intermediate values, and under normal circumstances, this state should be avoided in the working process of the capacitor, as the capacitance value of the adjustable capacitor in this state is an uncertain value. The selected connecting wire conductors E1 and E2 have fatigue resistance characteristics, and thus the connecting wire conductors E1 and E2 will not be broken under repeated extension and compression, and in the extension and compression process, the tensile forces and the elastic forces during compression of the connecting wire conductors E1 and E2 are always kept at constant values. In order to reduce the effect of the resistance values of the connecting wire conductors E1 and E2 on the Q value of the adjustable capacitor, the selected material of the connecting wire conductors E1 and E2 is a material with high conductivity.

Figure 8:
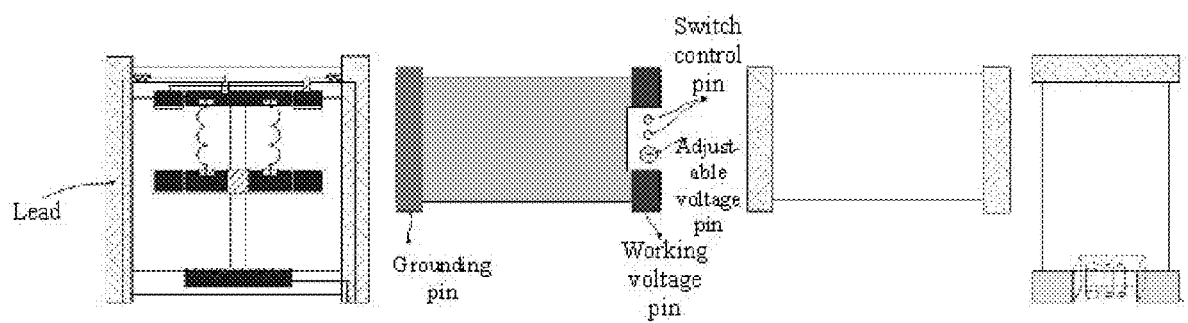
FIG. 8 is structural diagrams of a package of the adjustable capacitor in Embodiment 1 of the present disclosure.
Figure 9:
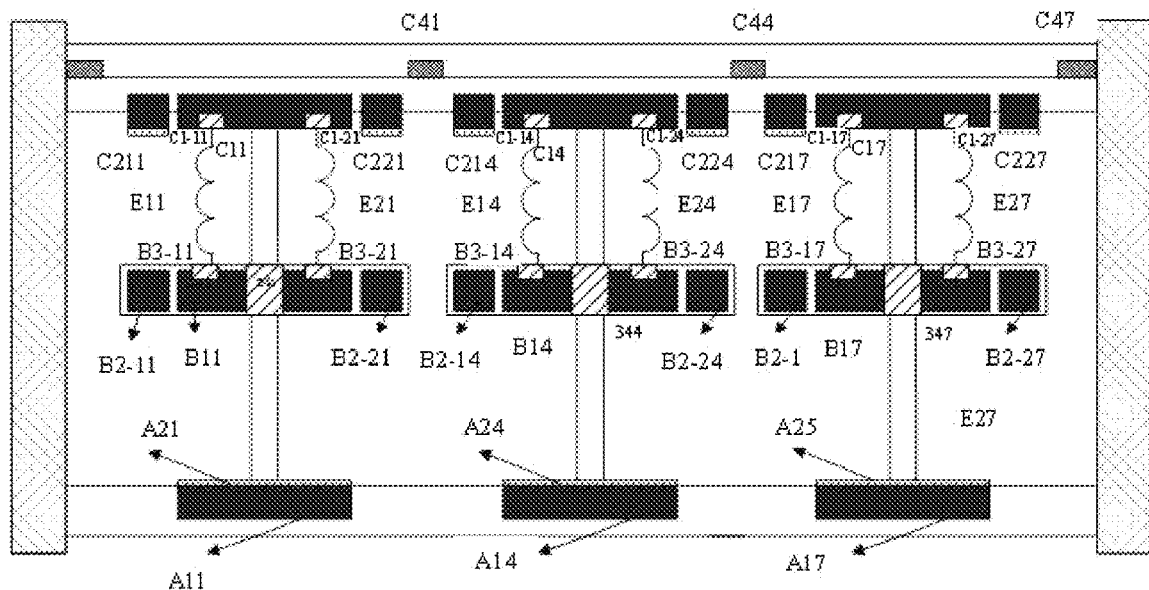
FIG. 9 is a cross-sectional exploded structural diagram of a combined capacitor in Embodiment 2 of the present disclosure.

FIG. 8 is structural diagrams of an embodiment of a package of the adjustable capacitor in the present embodiment. Metal is sputtered to a single adjustable capacitor to form the lower electrode A1 of the capacitor, a dielectric material is deposited based on the lower electrode A1 to form a dielectric isolation layer A2, and a metal lead is deposited to connect the lower electrode A1 of the capacitor and is led out to a working voltage pin. By means of deposition or bonding, a fixed apparatus D is manufactured at a central position of the dielectric isolation layer A2, wherein the form of the fixed apparatus D comprises but is not limited to forms such as a fixed shaft, a fixed plate, a fixed cavity, and a fixed spring. The fixed apparatus D enables the movable plate B to stably move up and down between the upper plate C and the lower plate A, without shifting in a horizontal direction, without jamming during moving, and without increasing the resistance.

The movable plate B is manufactured by using monocrystalline silicon as a substrate, shallow slots are respectively etched in a movable electrode B1 region and adjustment electrode B2 regions, metal is sputtered in the slots and planarized, and metal is filled in the slots to form the movable electrode B1 and the adjustable electrodes B2 respectively. Then, a slot B3-1 and a slot B3-2 are provided on the movable plate B, a slot or through hole B4 having the same cross-sectional shape as the fixed apparatus D is then etched at the center of the movable plate B, then the slot or through hole B4 on the movable plate B passes through the fixed apparatus D, the face on which the movable electrode B1 is provided faces downwards, the face on which the adjustment electrodes B2 are provided face upwards, and then the slot B3-1 and the slot B3-2 respectively fix one end of the connecting wire conductor E1 and one end of the connecting wire conductor E2.

The upper plate C is manufactured by using monocrystalline silicon as a substrate, shallow slots are etched in a capacitor forming region and adjustment electrode regions at two sides thereof, after forming the shallow slots, continue to drill in the middle of the adjustment electrode regions to etch deep slots, then metal is sputtered in the slots and planarized, and the slots are filled with metal; metal on the upper shallow slots forms the upper electrode C1, the adjustment electrode C2-1 and the adjustment electrode C2-2 of the capacitor, and the lower deep slots are filled with metal to form lead-out conductive wires which are connected to the switch C4-1, and metal leads are deposited to lead the upper electrode and the adjustment electrodes to the edge of the upper plate C. After the upper plate C is manufactured, the upper plate C is bonded to the fixed apparatus D, so that the upper plate C and the lower plate A are electrically assembled together, and then from two ends of the package respectively, an upper electrode lead-out wire on the control layer C4 on the upper plate C, a control lead-out wire of the switch and an adjustable voltage lead-out wire are led out from two end side faces of the capacitor to a grounding pin, a control pin and an adjustable voltage pin of the capacitor.

Embodiment 2

The present embodiment provides a combined capacitor composed of 9 adjustable unit capacitors as shown in FIGS. 9-16. Upper electrodes C11, C12, C13, C14, C15, C16, C17, C18, C19, and 9 pairs of adjustment electrodes C211, C221, C212, C222, C213, C223, C214, C224, C215, C225, C216, C226, C217, C227, C218, C228, C219 and C229 on an upper plate C of the 9 adjustable unit capacitors are all distributed on one upper plate C and are isolated from one another, wherein C11, C12 and C13 are connected to one another on an electrode layer as one group, C14, C15 and C16 are connected to one another at the electrode layer as one group, and C17, C18 and C19 are connected to one another on the electrode layer as one group, i.e., a total of three groups, and then each group is connected to a total lead conductor, and then the total lead conductors are connected to a grounding pin of the capacitor, each pair of adjustment electrodes in the 9 pairs of adjustment electrodes on the upper plate C are connected to each other by means of a lead conductor, then each pair of adjustment electrodes are connected to one end of a switch in a switch matrix, and the other end of the switch is connected to an adjustable voltage pin of the adjustable unit capacitor by means of a lead conductor. 9 lower electrodes A11, A12, A13, A14, A15, A16, A17, A18 and A19 in the combined capacitor are distributed on one lower plate A and are isolated from one another, then A11, A12 and A13 are connected to one another as a group, A14, A15 and A16 are connected to one another as a group, and A17, A18 and A19 are connected to one another as a group, and each group of the three groups of lower electrodes is respectively connected to a lead conductor, and then the lead conductors are connected to a working voltage pin of the combined capacitor, wherein the upper electrodes in the upper plate electrode layer and upper electrode leads are insulated and isolated from one another by means of a dielectric, the upper electrodes and adjustment electrode leads are insulated and isolated from one another by means of a dielectric, leads between the lower electrodes A1 of the lower plate A are isolated from one another, and the leads are isolated from or do not overlap with the upper electrodes and the adjustment electrodes on the upper plate electrode layer, and the lower electrodes A1 on the lower plate A. The 9 upper electrodes C11, C12, C13, C14, C15, C16, C17, C18, C19 and the 9 lower electrodes A11, A12, A13, A14, A15, A16, A17, A18 and A19 have the same shapes and sizes, and are strictly aligned in the vertical direction, and 9 corresponding fixed apparatuses D and 9 groups of connecting wire conductors E1 and E2 together constitute the combined capacitor. The 9 lower electrodes A11, A12, A13, A14, A15, A16, A17, A18 and A19 distributed on the electrode layer of the lower plate A, and movable electrodes B1 of 9 corresponding movable plates B which is able to move on the 9 fixed apparatuses D constitute 9 unit capacitors, and in each unit capacitor, the movable electrode B1 on the movable plate B and the lower electrode A1 on the lower plate A are strictly aligned in the vertical direction. Each slot of corresponding 9 pairs of slots on the movable electrodes B1 of the 9 movable plates B is connected to one end of a corresponding connecting wire conductor E1/E2 of the corresponding 9 pairs of connecting wire conductors E1 and E2; and the other end of each connecting wire conductor E1/E2 of the 9 pairs of connecting wire conductors E1 and E2 is connected to each slot of 9 pairs of slots on the 9 upper electrodes of the upper plate electrode layer corresponding to the movable electrodes B1 of the 9 movable plates B. The center positions of the 9 upper electrodes distributed on the upper plate electrode layer are vertically connected and fixed to the center positions of the 9 corresponding fixed apparatuses D respectively, and the other ends of the center positions of the 9 fixed apparatuses D are vertically connected and fixed together to the center positions of the 9 lower electrodes A11, A12, A13, A14, A15, A16, A17, A18 and A19 respectively. The 9 fixed apparatuses D fix the upper plate C and the lower plate A of the combined capacitor, make the upper plate C and the lower plate A of the combined capacitor parallel and separated by a certain spacing, and make the periphery edges of the upper plate C and the lower plate A aligned, and the 9 movable plates B move between the upper plate C and the lower plate A in any combination so as to adjust the magnitude of the combined capacitor. The 9 adjustment electrodes of the upper plate electrode layer and the 9 adjustment electrodes corresponding to the 9 parallel movable plates B capable of moving in parallel on the 9 fixed apparatuses D constitute 9 adjustment units, and the 9 unit capacitors and 9 corresponding adjustment units in the combined capacitor constitute 9 adjustable unit capacitors by means of the 9 movable plates B assembled on the 9 fixed apparatuses D.

In this embodiment, the capacitance value of each capacitor of the 9 adjustable unit capacitors in the combined capacitor is able to be individually adjusted, and the capacitance values of the plurality of adjustable unit capacitors are able to be adjusted in any combination, so as to achieve different capacitance values of the combined capacitor. An exemplary adjustment method is: an external controller is connected to an IIC control pin of the combined capacitor in this embodiment by means of an IIC bus, the external controller is configured as a master controller, IIC on 9 switches inside the combined capacitor are all slave controllers, and a control switch of each unit capacitor of the 9 unit capacitors is allocated with an address; and the master controller identifies each specific switch of the 9 switches by means of bus addresses, and then performs precise on/off control on a specific switch or a group of switches, so as to achieve different capacitance values of the combined capacitor.

In this embodiment, the power-on sequence of the controllers needs to be controlled in an application process of the combined capacitor. The specific power-on sequence is first to apply an adjustable voltage on the adjustable voltage pin, then to apply a working voltage on the working voltage pin, and then to adjust and control on/off of the 9 switches in a switch matrix according to working requirements of a matching circuit, so that the capacitance value of the combined capacitor is adjusted to a required capacitance value. After the capacitance value of the capacitor is adjusted, a working voltage is finally applied to an applied circuit. If the combined capacitor is applied to a power amplifier circuit, after the capacitance value of the capacitor is adjusted according to the described sequence, power is finally supplied to a gate voltage of a power amplifier tube, thereby avoiding a problem of causing instability to the applied circuit in the process of capacitance value adjustment and switching.

Figure 10:
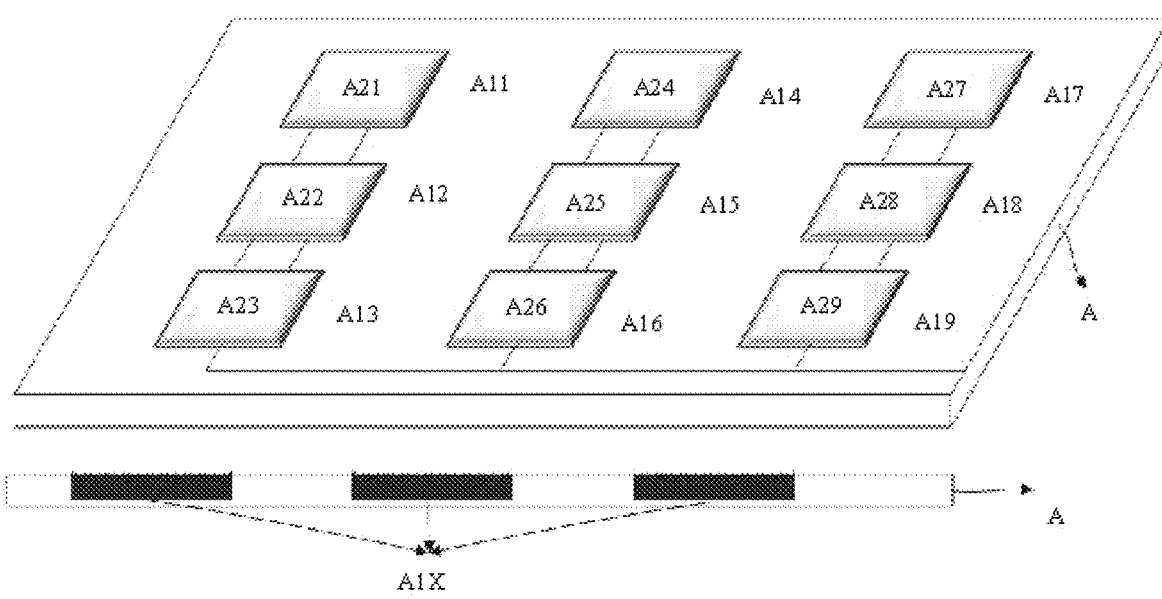
FIG. 10 is structural diagrams of a lower plate A of the combined capacitor in Embodiment 2 of the present disclosure.

FIG. 10 is structural diagrams of the lower plate A of the combined capacitor according to Embodiment 2 of present disclosure. In this embodiment, 9 lower electrodes A11, A12, A13, A14, A15, A16, A17, A18 and A19 are distributed on the lower plate A, and the 9 lower electrodes A11, A12, A13, A14, A15, A16, A17, A18 and A19 are isolated from one another by means of a dielectric material. After A11, A12 and A13 are connected to one another by sputtering lead conductors, A14, A15 and A16 are connected to one another by sputtering lead conductors, A17, A18 and A19 are connected to one another by sputtering lead conductors, and then the three groups of lower electrodes are respectively connected to one total lead conductor, and the total lead conductor is then connected to a working voltage pin of the combined capacitor, and all the described lead conductors do not overlap with the upper electrode C1 of the upper plate electrode layer and the movable electrode B1 of the movable plate B in a routing process, thereby preventing a parasitic capacitance possibly caused by the leads. In addition, the materials, sizes and resistance values of the lead wires and single lower electrode determine the voltage withstand capability of a working voltage electrode of the combined capacitor, and a dielectric material is covered on each lower electrode to form isolation layers A21, A22, A23, A24, A25, A26, A27, A28 and A29 respectively for isolating a movable electrode B1 and a lower electrode A1 in each adjustable capacitor.

Figure 11:
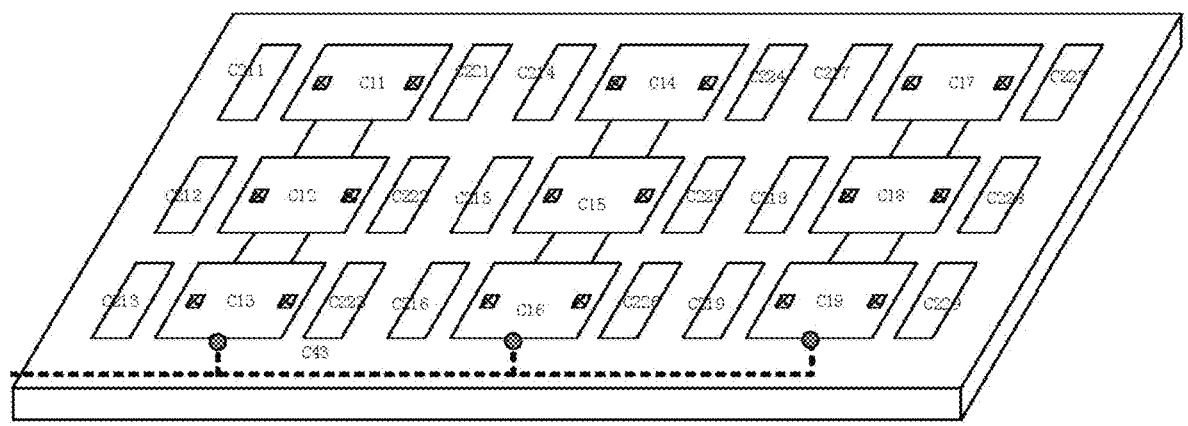
FIG. 11 is a structural diagram of an upper plate C of the combined capacitor in Embodiment 2 of the present disclosure.

FIG. 11 is a schematic structural diagram of the upper plate electrode layer of the combined capacitor in Embodiment 2. In the present embodiment, a total of 9 upper electrodes C11, C12, C13, C14, C15, C16, C17, C18 and C19 are distributed on the upper plate electrode layer, and respectively have the same shape and area as the 9 lower electrodes A11, A12, A13, A14, A15, A16, A17, A18, A19 on the corresponding lower plate A, and the upper electrodes C11, C12, C13, C14, C15, C16, C17, C18 and C19 and the lower electrodes A11, A12, A13, A14, A15, A16, A17, A18, A19 are aligned in distribution, and the 9 upper electrodes C11, C12, C13, C14, C15, C16, C17, C18 and C19 are isolated from one another by means of a dielectric material; wherein C11, C12, C13 are a group and are connected to one another by lead conductors, C14, C15, C16 are a group and are connected to one another by lead conductors, and C17, C18, C19 are a group and are connected to one another by lead conductors, each group of upper electrodes are connected to a total lead by means of leads, and the total leads are then connected to a grounding pin of the capacitor by means of a side-edge packaging path of the capacitor. A pair of adjustment electrodes are respectively distributed at two sides of each upper electrode, and there are a total of 9 pairs of adjustment electrodes, which are respectively C211, C221, C212, C222, C213, C223, C214, C224, C215, C225, C216, C226, C217, C227, C218, C228, C219 and C229, each pair of adjustment electrodes in the 9 pairs of adjustment electrodes are respectively aligned with a pair of adjustment electrodes of one movable plate B of the corresponding 9 movable plates B; then each adjustment electrode is provided with a metal via hole to allow for connection to a lead conductor corresponding to the control layer C4 on the upper plate C. The above-mentioned lead conductors all do not overlap with the upper electrodes on the upper plate electrode layer, the movable electrodes B1 of the movable plates B and the lower electrodes A1 on the lower plate electrode layer, so as to avoid crossing between leads as far as possible, thereby reducing a parasitic capacitance possibly caused thereby.

Figure 12:
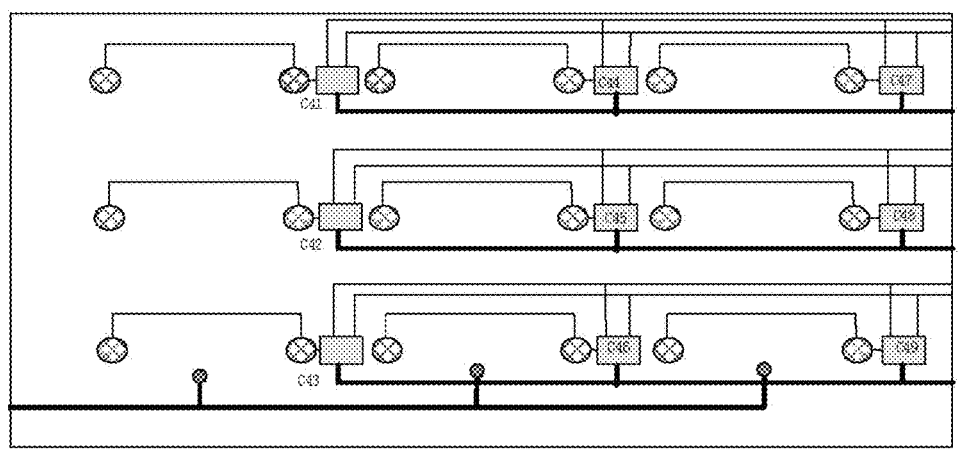
FIG. 12 is a structural diagram of a control layer C4 of the upper plate C in the combined capacitor in Embodiment 2 of the present disclosure.
Figure 13:
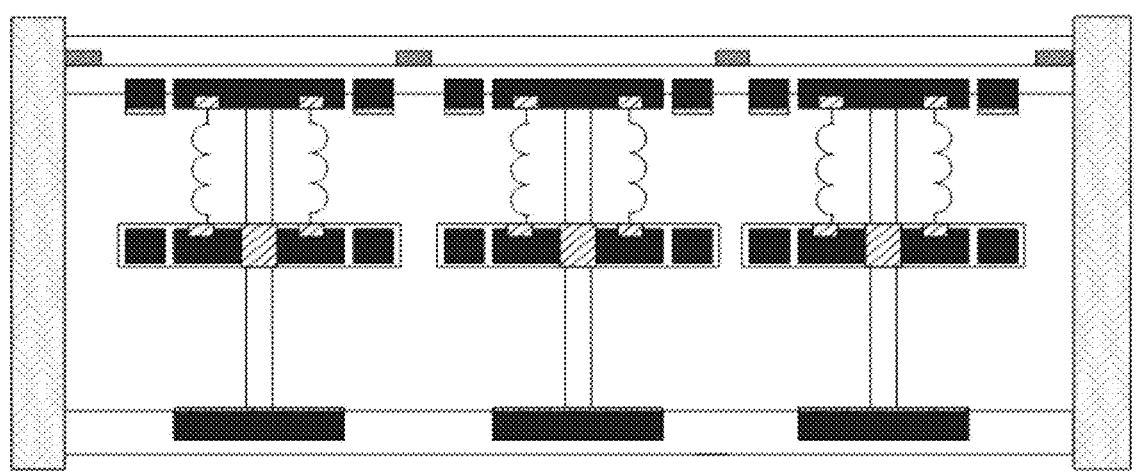
FIG. 13 is an overall sectional view of composition of an adjustable unit capacitor in Embodiment 2 of the present disclosure.
Figure 14:
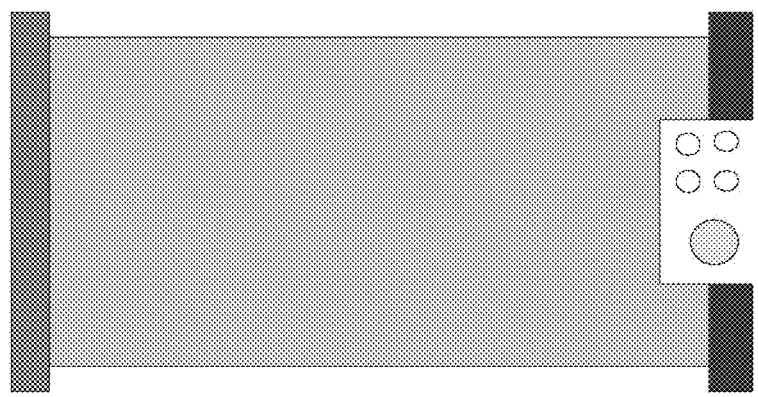
FIG. 14 is a bottom view of a package of the combined capacitor in Embodiment 2 of the present disclosure.
Figure 15:
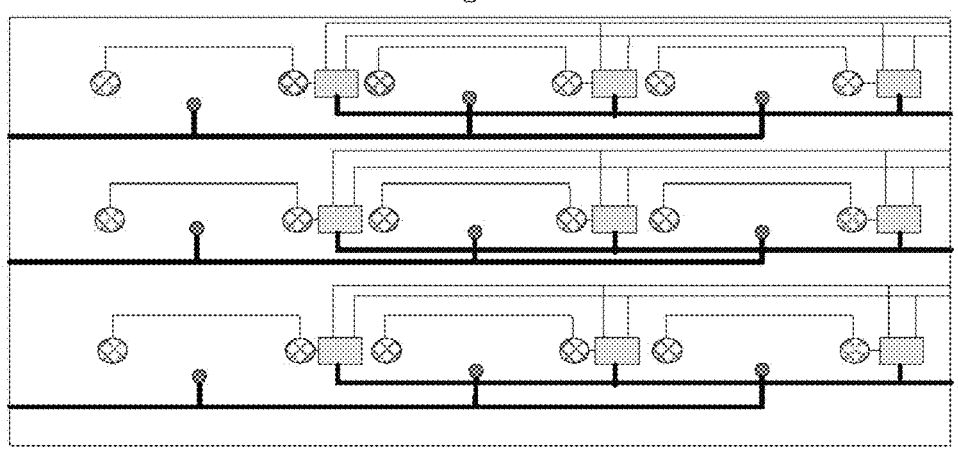
FIG. 15 is a structural diagram of connecting wire conductors of the combined capacitor in Embodiment 2 of the present disclosure.
Figure 16:
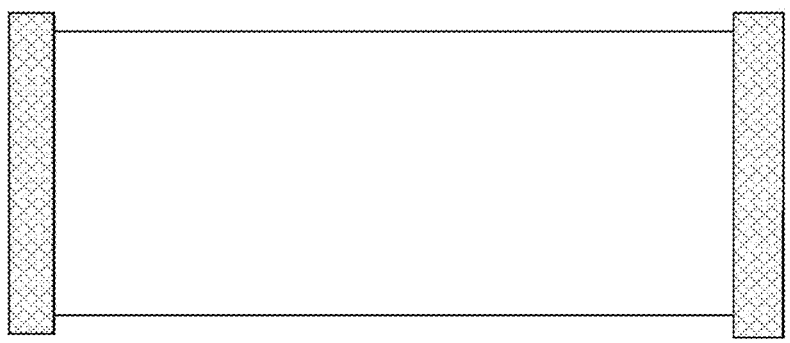
FIG. 16 is a bottom view of a package of the combined capacitor in Embodiment 2 of the present disclosure.

FIG. 12 is a schematic structural diagram of the control layer C4 of the upper plate C of the combined capacitor in Embodiment 2. In this embodiment, 9 switches distributed on the control layer C4 of the upper plate C of the combined capacitor are C41, C42, C43, C44, C45, C46, C47, C48, and C49, respectively. Each pair of adjustment electrodes are connected to one end of a switch of the 9 switches of the control layer C4 by means of the metal via holes, and then every three switches form a group and are connected to a control bus, on the control buses, each switch is allocated with one address, and the 9 switches are allocated with 9 addresses in total. An external or internal processor identifies each switch through the bus addresses, and then implements on-off control of each switch. Finally, the other ends of the 9 switches are connected together and then are connected to an adjustable voltage pin of the capacitor through leads, the bus is connected to a corresponding bus control pin outside a package of the capacitor by using corresponding conductive wires. The described conductive wires do not overlap with the upper electrodes of the upper plate electrode layer, the movable electrodes B1 of the movable plates B and the lower electrodes A1 of the lower plate electrode layer.

FIGS. 13-16 are schematic diagrams related to packaging of the combined capacitor in the present embodiment. The combined capacitor is packaged in a sealed space, and the exemplary implementation process of packaging is as follows: firstly, on monocrystalline silicon, by using the monocrystalline silicon as a substrate, etching on the monocrystalline silicon to form a lower plate A of the combined capacitor and wall plates packaging the periphery of the combined capacitor, then, on the surface of the lower plate A, forming 9 lower electrodes A11, A12, A13, A14, A15, A16, A17, A18, A19 with regular shapes by means of sputtering, then forming isolation layers on the 9 lower electrodes A11, A12, A13, A14, A15, A16, A17, A18, A19 respectively by means of depositing a dielectric with a high Q value and a high dielectric constant on the surfaces of the 9 lower electrodes A11, A12, A13, A14, A15, A16, A17, A18, A19; then, dividing the 9 lower electrodes A11, A12, A13, A14, A15, A16, A17, A18, A19 into three groups by means of sputtering metal leads, wherein 3 lower electrodes of each column are connected to one another, and then connected a sputtered bus, and the buses are connected to a working voltage pin of the combined capacitor, and then forming or manufacturing 9 fixed apparatuses D at the center positions of the 9 lower electrodes A11, A12, A13, A14, A15, A16, A17, A18, A19 on the lower plate A by means of deposition or bonding, the form of the fixed apparatus D comprising but not limited to forms such as a fixed shaft, a fixed plate, a fixed cavity, and a fixed spring, then by using monocrystalline silicon as a substrate, manufacturing 9 movable plates B of the same shape and the same size, respectively etching slots in a movable electrode region and adjustment electrode regions at two sides of each movable plate B, sputtering metal in the slots and planarizing same, and filling the slots with metal, so as to form the movable electrode B1 and the adjustment electrodes of each movable plate B; and then etching, at the center of each movable plate B, a through hole having the same cross-sectional shape as the fixed apparatus D, and the through hole having slightly greater size; moreover, etching slots on the movable electrodes B1 for connection of connecting conductors, and fixing a connecting wire conductor in the slot of each movable plate B.

By using monocrystalline silicon as a substrate, manufacturing an upper plate C; distributing, on the upper plate C, 9 regions having the same area and shape as the movable plates B; by using one face of the 9 regions as an electrode layer, respectively forming adjustment electrodes and upper electrodes of the upper plate C by means of sputtering metal, and by using the other face as a control layer C4, etching a wafer circuit of a corresponding switch on the control layer C4; further, by means of sputtering corresponding connecting wire conductors, distributing all the switches and connecting wire conductors in gaps between the upper electrodes and the adjustment electrodes, wherein the switches and connecting wire conductors do not overlap with the upper electrodes and the adjustment electrodes; opening metalized via holes to connect the adjustment electrodes to a corresponding switch, and sputtering corresponding connecting wires to edges of the electrode layer and the control layer C4, for leading out the wires to a grounding electrode and an adjustable voltage electrode which are connected to the combined capacitor, and finally, correspondingly connecting and fixing the other ends of the connecting wire conductors on the 9 movable plates B to the slots on the 9 upper electrodes, and then mounting together the whole upper plate C and the 9 movable plates B on a base slot of the lower plate A, and then sealing the whole combined capacitor and processing an external pin surface layer, and finally achieving packaging of the capacitor.

For the convenience of description, in the description process of the described apparatus, only a single adjustable unit capacitor and a combined capacitor composed of 9 adjustable unit capacitors are described. Of course, in implementing some embodiments of the present disclosure, the functions of all modules or units may be achieved in one piece or multiple pieces of hardware by any combination of N different unit capacitors. A person skilled in the art would appreciate that embodiments of the present disclosure may be provided as methods, devices, implementation processes, and products.

Figure 17:
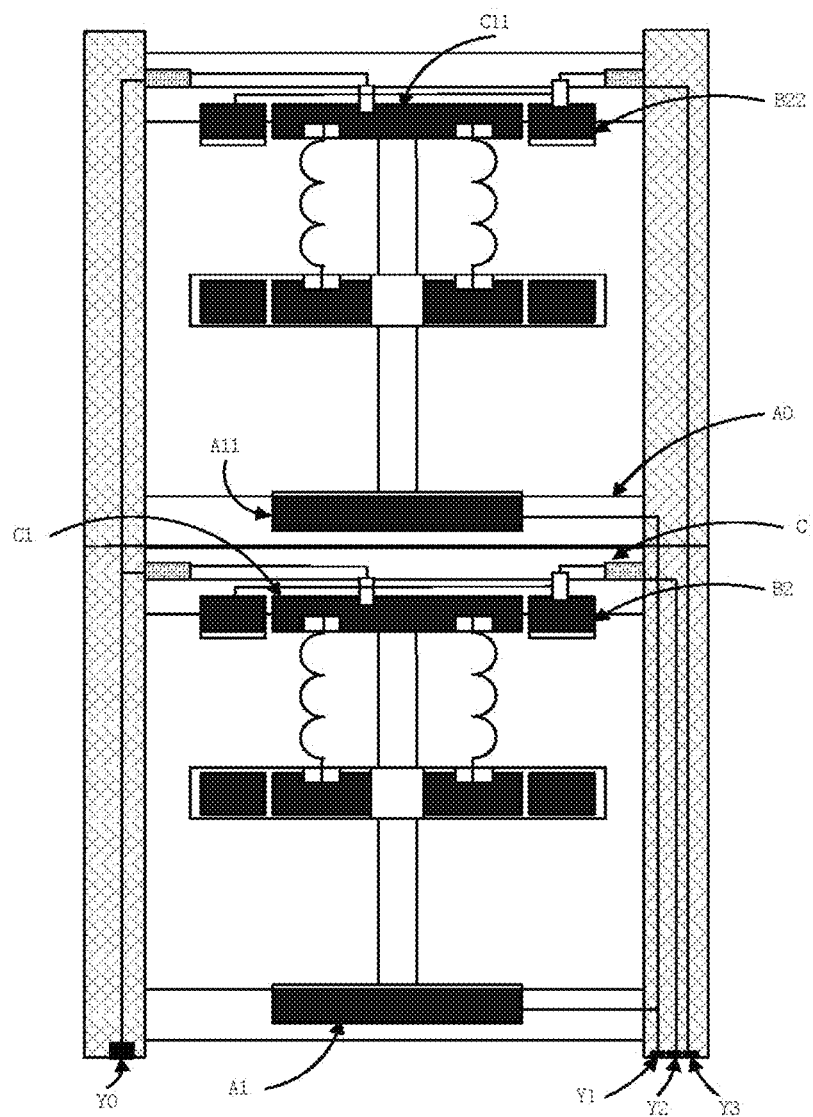
FIG. 17 is a second combination of a combined capacitor in Embodiment 3 of the present disclosure.

FIG. 17 is a diagram according to Embodiment 3 of present disclosure. In this embodiment, N combined capacitors may be longitudinally superposed to form a combined capacitor. In this embodiment, a schematic diagram in which two capacitors of N superposed capacitors are selected to be superposed together to form the combined capacitor is shown. In this embodiment, two adjustable unit capacitors, i.e., an adjustable unit capacitor 100 and an adjustable unit capacitor 200 are longitudinally superposed to form the combined capacitor. A lower plate A0 of the adjustable unit capacitor 100 and an upper plate C of the adjustable unit capacitor 200 share one plate. Adjustment electrodes B2 of the adjustable unit capacitor 200 are connected to one end of a switch of a control layer C4 through via holes, and the other end of the switch is connected to an adjustable voltage control pin Y2 through a lead; and adjustment electrodes B22 of the adjustable unit capacitor 100 are connected to one end of a switch of a control layer C4 through via holes, and the other end of the switch is then connected to an adjustable voltage control pin Y3 through a lead. Adjustable voltages Y2 and Y3 can be respectively controlled by applying different control voltages, or are connected to the same control voltage and controlled at the same time. An upper electrode C11 of the adjustable unit capacitor 100 and an upper electrode C1 of the adjustable unit capacitor 200 are connected to a grounding pin Y0 through leads respectively; and a lower electrode A0 of the adjustable unit capacitor 100 and a lower electrode A1 of the adjustable unit capacitor 200 are connected to a power supply working voltage pin Y1 through leads respectively. N adjustable unit capacitors in the longitudinally packaged combined capacitor are longitudinally packaged together, and the characteristics thereof are that the capacitor has a small package and occupies a small area.

Figure 18:
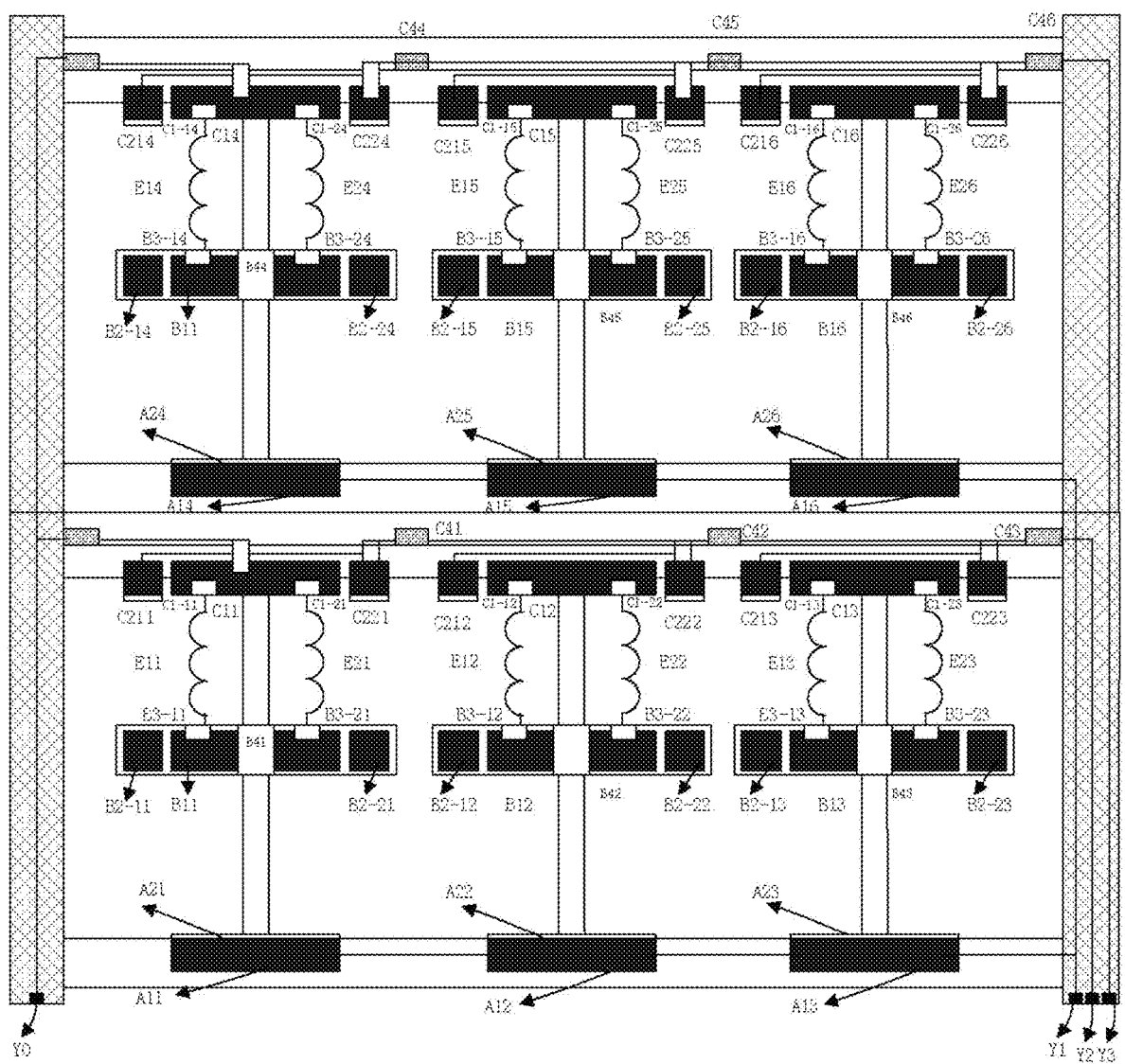
FIG. 18 is a third combination of the combined capacitor in Embodiment 3 of the present disclosure.

FIG. 18 a diagram according to Embodiment 3 of the present disclosure. In this embodiment, first, three adjustable unit capacitors 300, 310 and 320 combined horizontally are combined into a combined capacitor 500, and then three adjustable unit capacitors 330, 340 and 350 combined horizontally are combined into a combined capacitor 400; the two combined capacitors 400 and 500 are superposed together to form a combined capacitor, and a lower plate A of the combined capacitor 400 and an upper plate C of the combined capacitor 500 share the same plate. Lower electrodes A11, A12 and A13 of the adjustable unit capacitors 300, 310 and 320 are all distributed on the same lower plate A, and are isolated from one another by means of a dielectric material, and the three lower electrodes are connected to one another by means of conductive wires and then are finally connected to a power supply voltage pin Y1; upper electrodes C11, C12 and C13 of the adjustable unit capacitors 300, 310 and 320 are all distributed on the same upper plate C and are isolated from one another by means of a dielectric material, and the three upper electrodes are connected to one another by means of conductive wires and then are connected to a grounding pin Y0 of the combined capacitor, adjustment electrodes B211 and B221 of the adjustable unit capacitors 300, 310 and 320 are connected to each other by means of a conductive wire and then are connected to one end of a switch C41 by means of a conductive wire, and the other end of the switch C41 is connected to an adjustable voltage control pin Y2 by means of a conductive wire; B212 and B222 are connected to each other by means of a conductive wire and then connected to one end of a switch C42 by means of a conductive wire, and the other end of the switch C42 is connected to the adjustable voltage control pin Y2 by means of a conductive wire; B213 and B223 are connected to each other by means of a conductive wire and then connected to one end of a switch C43 by means of a conductive wire, and the other end of the switch C43 is connected to the adjustable voltage control pin Y2 by means of a conductive wire.

Lower electrodes A14, A15 and A16 of the adjustable unit capacitors 330, 340 and 350 are all distributed on one lower plate A, and are isolated from one another by means of a dielectric material, and the three lower electrodes are connected to one another by means of conductive wires and then are finally connected to the power supply voltage pin Y1; upper electrodes C14, C15 and C16 of the adjustable unit capacitors 330, 340 and 350 are all distributed on an upper plate C and are isolated from one another by means of a dielectric material, and the three upper electrodes are connected to one another by means of conductive wires and then are connected to the grounding pin Y0 of the combined capacitor, adjustment electrodes B214 and B224 of the adjustable unit capacitors 330, 340 and 350 are connected to each other by means of a conductive wire and then are connected to one end of a switch C44 by means of a conductive wire, and the other end of the switch C44 is connected to an adjustable voltage control pin Y3 by means of a conductive wire; B215 and B225 are connected to each other by means of a conductive wire and then connected to one end of a switch C45 by means of a conductive wire, and the other end of the switch C45 is connected to the adjustable voltage control pin Y3 by means of a conductive wire; and B216 and B226 are connected to each other by means of a conductive wire and then connected to one end of a switch C46 by means of a conductive wire, and the other end of the switch C46 is connected to the adjustable voltage control pin Y3 by means of a conductive wire.

In conclusion, the MEMS structure-based adjustable capacitor not only has a high Q value, but also has high voltage withstand and current withstand capabilities. By means of packaging a plurality of adjustable capacitors in a package, the continuous and step adjustment of the capacitance value of a combined capacitor can be achieved. The capacitance value of the capacitor can be programmable and adjustable by means of an external or internal processor, having good application environment adaptability. The adjustment electrodes are movable electrodes B1 with fixed potential states, thereby avoiding the effect of direct-current bias of a radio frequency circuit at two ends of a variable capacitor on the movement of a switch arm. Different from a conventional variable capacitor, the movable electrode B1 moves horizontally up and down, and the electrode itself has no deformation, which can reduce parasitic capacitance and has a higher capacitance change linearity. The adjustment electrodes are constantly in an electric field blocking state, reducing the effect of external mechanical vibration. A semiconductor is welded with a dielectric material by using a low-temperature solder, while achieving wafer level packaging.

The content above is further detailed description of some embodiments of the present disclosure with reference to specific preferred embodiments, and it cannot be determined that the exemplary embodiments of present disclosure are only limited to these descriptions. For a person having ordinary skill in the technical field to which the present disclosure belongs, several simple deductions or replacements may also be made without departing from the concept of some embodiments of the present disclosure, and all these deductions and improvements shall be considered as belonging to the scope of protection of the present disclosure.

What is claimed is:

1. A Micro-Electro-Mechanical System (MEMS) structure-based adjustable capacitor, comprising a lower plate A, a movable plate B, an upper plate C, a fixed apparatus D and one or more connecting conductors E; wherein a lower end of the fixed apparatus D is fixedly connected to the lower plate A, an upper end of the fixed apparatus D is fixedly connected to the upper plate C, the movable plate B is provided with a structure B4 which is able to move freely in parallel in cooperation with the fixed apparatus D, the movable plate B is mounted on the fixed apparatus D by means of the structure B4, and the movable plate B is able to move up and down along the fixed apparatus D;

the lower plate A is provided with a lower electrode A1, and the movable plate B is provided with a movable electrode B1 and adjustment electrodes B2;

the lower electrode A1 and the movable electrode B1 constitute a unit capacitor, and the lower electrode A1 and the movable electrode B1 are isolated by means of a dielectric;

the upper plate C is provided with an upper electrode C1 and adjustment electrodes C2; two ends of each of the one or more connecting conductors E are respectively electrically connected to the upper electrode C1 and the movable electrode B1;

the adjustment electrodes C2 and the adjustment electrodes B2 constitute adjustment units, and the adjustment electrodes C2 and the adjustment electrodes B2 are isolated by means of a dielectric; and in a working state, the lower electrode A1 is constantly applied with a working voltage, the working voltage generates an electrostatic attraction force on the movable electrode B1, and an electrostatic attraction force of the adjustment electrodes C2 on the adjustment electrodes B2 is adjusted by controlling an adjustable voltage applied to the adjustment electrodes C2, or by adjusting areas, spacings and/or materials of the adjustment electrodes C2, so that a magnitude relationship between an attraction force of the lower electrode A1 on the movable plate B and an attraction force of the adjustment electrodes C2 on the movable plate B changes, thereby enabling the movable plate B to move up and down along the fixed apparatus D to adjust a capacitance value of the MEMS structure-based adjustable capacitor.

2. The MEMS structure-based adjustable capacitor according to claim 1, wherein the lower electrode A1 is provided with one or more dielectric layerdielectric isolation layers A2 for isolating the lower electrode A1 from the movable electrode B1.

3. The MEMS structure-based adjustable capacitor according to claim 1, wherein the adjustment electrodes C2 and the adjustment electrodes B2 constitute adjustment units, the adjustment electrodes C2 are provided with dielectric isolation layers C3 for isolating the adjustment electrodes C2 from the adjustment electrodes B2, the adjustment electrodes C2 do not overlap with the movable electrode B1 and the lower electrode A1, and the adjustment electrodes B2 do not overlap with the upper electrode C1 and the lower electrode A1.

4. The MEMS structure-based adjustable capacitor according to claim 1, wherein the lower plate A is made of a dielectric material, a metal conductor covered or embedded on the surface of the dielectric material of the lower plate A forms the lower electrode A1, one or more dielectric isolation layers A2 are provided on the surface of the lower electrode A1, for isolating the lower electrode A1 from the movable electrode B1, and also for adjusting the capacitance value and a Q value of the MEMS structure-based adjustable capacitor.

5. The MEMS structure-based adjustable capacitor according to claim 1, wherein the movable plate B is made of a dielectric material, a structure B4 which is able to move freely in parallel in cooperation with the fixed apparatus D is provided in the middle of the movable plate B, and the movable plate B is sleeved on the fixed apparatus D by means of the movable plate B itself or by means of the structure B4; and metal conductors covered or embedded on the surface of the dielectric material of the movable plate B form the movable electrode B1 and the adjustment electrodes B2, the adjustment electrodes B2 are distributed on the periphery of the movable electrode B1, the adjustment electrodes B2 and the movable electrode B1 are isolated from one another by means of a dielectric, the movable electrode B1 has the same shape as the lower electrode A1 and the upper electrode C1, and is aligned with the lower electrode A1 and the upper electrode C1 on a vertical plane, and the adjustment electrodes B2 and the adjustment electrodes C2 have the same shape, and are aligned on the vertical plane.

6. The MEMS structure-based adjustable capacitor according to claim 1, wherein the upper plate C is made of a dielectric material, a metal conductor covered or embedded on the surface of the dielectric material of the upper plate C forms the upper electrode C1, metal conductors covered or embedded on the surfaces of the dielectric material at the periphery of the upper electrode C1 form the adjustment electrodes C2, the upper electrode C1 and the adjustment electrodes C2 are isolated from one another by means of the dielectric material, dielectric isolation layers C3 are provided on the surfaces of the adjustment electrodes C2, the upper plate C is provided with a control layer C4, each of the adjustment electrodes C2 is connected to one end of a switch in a control layer C4, and the other end of the switch in the control layer C4 is connected to an adjustable voltage pin of the adjustable unit capacitor.

7. The MEMS structure-based adjustable capacitor according to claim 1, wherein the fixed apparatus D has one end fixed to the upper electrode C1 of the upper plate C, and the other end fixed to the lower electrode A1 of the lower plate A, and is used for supporting the upper plate C and the lower plate A and maintaining the upper plate C and the lower plate A parallel, and a fixing method of the fixed apparatus D comprises welding, pressing or bonding.

8. The MEMS structure-based adjustable capacitor according to claim 1, wherein the one or more connecting conductors E consist of 1 to M connecting conductors; 1 to M slots are correspondingly provided on an upper surface of the movable electrode B1, and 1 to M slots are correspondingly provided on a lower surface of the upper electrode C1; one end of each of the 1 to M connecting conductors is electrically connected to a corresponding slot of the 1 to M slots on the lower surface of the upper electrode C1, and the other end of each of the 1 to M connecting conductors is electrically connected to a corresponding slot of the 1 to M slots on the upper surface of the movable electrode B1; the upper electrode C1 is electrically connected to the movable electrode B1 by means of the 1 to M connecting conductors, and resistance values of the 1 to M connecting conductors are set to be less than a preset value; and the 1 to M connecting conductors have equal lengths, so that the movable plate B is kept parallel to the upper plate C and the lower plate A in a natural state.

9. The MEMS structure-based adjustable capacitor according to claim 8, wherein the one or more connecting conductors E are not short-circuited to the adjustment electrodes C2 and the adjustment electrodes B2 in a static state or a moving state; and the one or more connecting conductors E have extension and retraction performances with extending forces and elastic forces remaining unchanged, and have sizes which are able to satisfy that the movable plate B is able to be in close contact with the upper plate C when being compressed, and is able to be in close contact with the lower plate A when being extended downwards.

10. The MEMS structure-based adjustable capacitor according to claim 1, wherein the one or more connecting conductors E, the lower electrode A1, the movable electrode B1, the adjustment electrodes B2, the upper electrode C1, and the adjustment electrodes C2 are made of metal materials, and substrate materials of the upper plate C, the movable plate B and the lower plate A are dielectric materials.

11. The MEMS structure-based adjustable capacitor according to claim 1, wherein an electrostatic attraction force Fx is generated on the movable electrode B1 by the lower electrode A1 after the lower electrode A1 is applied with a working voltage, and an electrostatic attraction force Fs generated on the adjustment electrodes B2 by the adjustment electrodes C2 after the adjustment electrodes C2 are applied with an adjustable voltage, and in a case where Fs is smaller than Fx, the movable plate B moves towards and finally gets close to the lower plate A, and at this time, the capacitance value of the adjustable unit capacitor reaches the maximum; in a case where Fs is greater than Fx, the movable plate B moves towards and finally gets close to the upper plate C, and at this time, the capacitance value of the adjustable unit capacitor reaches the minimum; and in a case where the adjustable voltage applied to the adjustment electrodes C2 is zero and the working voltage applied to the lower electrode A1 is not zero, the movable plate B moves towards the lower plate A, to keep the adjustable unit capacitor in a state of a maximum capacitance value.

12. The MEMS structure-based adjustable capacitor according to claim 1, wherein the unit capacitor and the adjustment units form an adjustable unit capacitor by means of the movable plate B, the lower electrode A1 of the adjustable unit capacitor is connected to a working voltage pin, the upper electrode C1 is connected to a grounding pin, each of the adjustment electrodes C2 is connected to one end of a switch on a control layer C4 by means of a metal via hole, and the other end of the switch in the control layer C4 is connected to an adjustable voltage pin; and a switch data transceiving bus is connected to a control pin, and a processor controls on/off of the switch and a voltage on the adjustable voltage pin by means of the switch data transceiving bus, so as to control the movement of the movable electrode B1 in the adjustable unit capacitor, thereby changing the capacitance value of the adjustable unit capacitor.

13. The MEMS structure-based adjustable capacitor according to claim 1, wherein the upper plate and the lower plate are packaged by using a non-metallic material, two pins of a capacitor are led out, and ground, a working voltage pin or a control pin is marked, the control pin is located at a vacated position of a capacitor pin or a gap position in a grounding pin, and finally packaging and sealing are performed; or the upper plate C and the lower plate A serve as a part of device packaging, and are externally added with a packaging material to achieve packaging of the MEMS structure-based adjustable capacitor.

14. The MEMS structure-based adjustable capacitor according to claim 1, wherein by setting parameters of shape and thickness of the one or more dielectric material layers A2 covering the lower electrode A1, two paths of signals are enabled to have equal amplitudes and opposite phases, so that the two paths of signals are able to cancel each other or resonance generated after a radio frequency signal is applied is prevented.

15. The MEMS structure-based adjustable capacitor according to claim 1, wherein N adjustable unit capacitors constitute a combined capacitor;

wherein a first composition manner of the combined capacitor is that N adjustable unit capacitors are superposed longitudinally to form the combined capacitor, wherein the lower electrode A1 of each of N unit capacitors is connected to a working voltage pin of the combined capacitor by means of a lead-out wire, and the upper electrode C1 of each of N unit capacitors is connected to a grounding pin of the combined capacitor by means of a lead-out wire, each of adjustment electrodes C21 to C2N of the N unit capacitors is respectively connected to one end of a corresponding one of N switches of the upper plates C of the N unit capacitors by means of a lead-out wire, the other end of each of the N switches is led out to a corresponding one of N adjustable voltage control pins of the combined capacitor, N lower electrodes A1 are connected to a working voltage pin, and N upper electrodes C1 are connected to the ground;

or, a second composition manner of the combined capacitor is that: in the combined capacitor, N upper electrodes C1 are distributed on one upper plate C, and are connected to a grounding pin of the combined capacitor by means of leads, N lower electrodes A1 are distributed on one lower plate A, and are connected to a working voltage pin of the combined capacitor by means of leads; and each of N adjustment electrodes C21 to C2N are connected to one end of a corresponding one of N switches distributed on a control layer C4 through metal via holes, the other end of each of the N switches is connected to a corresponding one of N adjustable voltage control pins of the combined capacitor, and all the leads do not overlap with the upper electrode C1, the movable electrode B1 and the lower electrode A1;

or, a third composition manner of the combined capacitor is that M combined capacitors are laterally expanded, and N combined capacitors each formed by M unit capacitors that are laterally expanded are longitudinally superposed and expanded to form a combined capacitor; M upper electrodes C1 of M unit capacitors at each layer of the combined capacitor are connected together by means of leads and then are connected to a grounding pin of the combined capacitor, M lower electrodes A1 are connected together by means of leads and then are connected to a working voltage pin of the combined capacitor, each of M adjustment electrodes C21 to C2M are respectively connected to one end of a corresponding one of M switches, the other end of each of the M switches a respectively connected to a corresponding one of M adjustable voltage control pins of the combined capacitor by means of a lead, and the combined capacitor has M*N adjustable voltage pins in total.

16. The MEMS structure-based adjustable capacitor according to claim 15, wherein a bus controller of each of N switches of a control layer C4 in the combined capacitor is connected to a control bus, each of the N switches connected to the bus is allocated with an address, a bus control protocol is used for specifically identifying each switch by means of the address, and an external or internal main controller controls the on/off of each switch by means of the address;

the bus is connected to a corresponding bus control pin outside a package of the MEMS structure-based adjustable capacitor by means of a corresponding conductive wire, the conductive wire does not overlap with the upper electrode C1 of an upper plate electrode layer, the movable electrode B1 of the movable plate B and the lower electrode A1 of a lower plate electrode layer, and an external processor controls on/off of the N switches according to the address of each switch, so as to achieve step adjustment of the combined capacitor and arbitrary adjustment of the capacitance value of the combined capacitor; wherein an internal controller is connected to an external controller by means of the bus, so as to transfer a magnitude of a required capacitance value of the MEMS structure-based adjustable capacitor.

17. The MEMS structure-based adjustable capacitor according to claim 16, wherein a usage mode of N adjustable unit capacitors in the combined capacitor is:

a working mode during initial use or reset use is: sequentially controlling, by a controller, a switch matrix so that an adjustable voltage is applied or not applied to adjustment electrodes C2 on an upper plate C of each adjustable unit capacitor, and a working voltage is applied or not applied to a lower electrode A1 of each lower plate A, such that a capacitance value of each of the N adjustable unit capacitors in the combined capacitor is a minimum value or a maximum value, to complete initial set or reset;

after power on, in a case where the capacitance value of the combined capacitor reaches the minimum, applying a working voltage to all the lower electrodes A1 of the combined capacitor, and adjusting the total capacitance value of the combined capacitor to a desired capacitance value by adjusting the controller to control on/off of switches of the switch matrix and adjusting or not adjusting a magnitude of the adjustable voltage, while maintaining states of all switches of the switch matrix and storing the states of all switches of the switch matrix;

after power on, in a case where the capacitance value of the combined capacitor reaches the maximum, by controlling to apply an adjustable voltage to all adjustment electrodes of the combined capacitor and to apply a working voltage to all the lower electrodes A1, controlling on/off of switches of the switch matrix and adjusting or not adjusting a magnitude of the adjustable voltage, thereby adjusting the total capacitance value of the combined capacitor to a desired capacitance value, while maintaining states of all switches of the switch matrix, and storing the states of all switches of the switch matrix;

in a case where the combined capacitor has been adjusted to a desired capacitance value, after power on again, by recalling the states of the switches of the switch matrix from a main controller, adjusting the switch matrix to an on/off state of the switch matrix of the desired capacitance value of the combined capacitor, and then applying the working voltage of the lower electrodes A1 and the adjustable voltage of the adjustment electrodes, thereby achieving the desired capacitance value of the combined capacitor, wherein after achieving the desired capacitance value, the capacitance value of the combined capacitor is able to be further adjusted to a new capacitance value by controlling on/off of corresponding switches in the switch matrix by the controller;

in a case where adjustment or change of a power on sequence and the capacitance value of the adjustable unit capacitor, and the initial capacitance value have an effect on use of a circuit, designing a protection measure in the circuit applying the combined capacitor, wherein the protection measure is enabling the circuit to be in a working state after adjusting the capacitance value of the adjustable capacitor to the required capacitance value.

18. The MEMS structure-based adjustable capacitor according to claims 15, wherein a package housing of the combined capacitor packages the N adjustable unit capacitors in a sealed space, and an external working voltage pin, a grounding pin, adjustable voltage pins and a control pin of the combined capacitor are respectively connected to the lower electrodes A1, the upper electrodes C1, the adjustment electrodes and control switches on the upper plate C and the lower plate A through leads and via holes, so as to achieve packaging of the N adjustable unit capacitors.

19. The MEMS structure-based adjustable capacitor according to claim 14, wherein a material coating is welded on the surfaces of a power supply pin, the grounding pin and the control pin, and the package housing is of a non-metallic material.

20. The MEMS structure-based adjustable capacitor according to claims 15, wherein each adjustable unit capacitor in the combined capacitor is able to be individually adjusted, and a plurality of adjustable unit capacitors is able to be adjusted in any combination, so as to achieve a plurality of step adjustments of the combined capacitor, and a exemplary implementation is that an internal or external processor controls on/off of N radio frequency switches in a control layer C4, so as to adjust the capacitance values of the N adjustable unit capacitors, thereby adjusting the capacitance value of the combined capacitor.

* * * * *